United States Patent
Rome et al.

(10) Patent No.: US 10,963,545 B2
(45) Date of Patent: Mar. 30, 2021

(54) AUTHENTICATION VIA TYPING CADENCE, GESTURES, AND QR CODES

(71) Applicant: Intensity Analytics Corporation, Warrenton, VA (US)

(72) Inventors: John D. Rome, Warrenton, VA (US); Bethann G. Rome, Warrenton, VA (US); Thomas E. Ketcham, II, Warrenton, VA (US)

(73) Assignee: Intensity Analytics Corporation, Warrenton, VA (US)

( * ) Notice: Subject to any disclaimer, the term of this patent is extended or adjusted under 35 U.S.C. 154(b) by 0 days.

(21) Appl. No.: 16/267,835

(22) Filed: Feb. 5, 2019

(65) Prior Publication Data

US 2019/0243955 A1 Aug. 8, 2019

Related U.S. Application Data

(63) Continuation of application No. 15/134,348, filed on Apr. 20, 2016, now Pat. No. 10,235,507.

(60) Provisional application No. 62/150,213, filed on Apr. 20, 2015.

(51) Int. Cl.
  *G06F 21/31* (2013.01)
  *G06F 21/46* (2013.01)

(52) U.S. Cl.
  CPC ............ *G06F 21/316* (2013.01); *G06F 21/46* (2013.01)

(58) Field of Classification Search
  None
  See application file for complete search history.

(56) References Cited

U.S. PATENT DOCUMENTS

| | | | |
|---|---|---|---|
| 4,621,334 A | | 11/1986 | Garcia |
| 4,805,222 A | * | 2/1989 | Young ................. G06F 21/316 382/115 |
| 5,557,686 A | | 9/1996 | Brown et al. |
| 6,151,593 A | | 11/2000 | Cho et al. |
| 6,161,185 A | | 12/2000 | Guthrie et al. |
| 6,442,692 B1 | | 8/2002 | Zilberman et al. |

(Continued)

OTHER PUBLICATIONS

U.S. Appl. No. 14/052,562, U.S. Pat. No. 9,430,626 filed Oct. 11, 2013, User Authentication Via Known Text Input Cadence.

(Continued)

*Primary Examiner* — Kaveh Abrishamkar
(74) *Attorney, Agent, or Firm* — Schwegman Lundberg & Woessner, P.A.

(57) ABSTRACT

Disclosed herein are techniques for authenticating a user via gestures, QR codes, and passphrases generated to incorporate typing habits of the user. A passphrase system generates a one-time use passphrase, which incorporates hallmarks and/or quirks of the user's typing, and presents the generated passphrase as an authentication challenge to authenticate as the user. If metrics collected during the authentication challenge are statistically similar to metrics of the user's typing, the authentication succeeds; otherwise, the authentication fails. A user's gesture habits during input of an authentication drawing may be used as a target for future authentication attempts. A user's input motions (typing and/or gestures) may be converted into a secure QR code; a different host device may use the secure QR code to obtain the target metrics for future authentication attempts of the user.

16 Claims, 18 Drawing Sheets

(56) References Cited

U.S. PATENT DOCUMENTS

| | | | |
|---|---|---|---|
| 8,141,775 B1* | 3/2012 | Aidasani | G06Q 20/3223 |
| | | | 235/379 |
| 9,355,236 B1* | 5/2016 | Kratz | G06F 21/31 |
| 9,430,626 B1* | 8/2016 | Rome | G06F 21/32 |
| 9,704,361 B1* | 7/2017 | Hazlewood | G08B 21/22 |
| 10,229,255 B2 | 3/2019 | Rome et al. | |
| 10,235,507 B1* | 3/2019 | Rome | G06F 21/46 |
| 2003/0228048 A1* | 12/2003 | Okada | G06T 7/62 |
| | | | 382/144 |
| 2004/0034788 A1 | 2/2004 | Ross | |
| 2004/0059950 A1 | 3/2004 | Bender et al. | |
| 2004/0187037 A1 | 9/2004 | Checco | |
| 2006/0153364 A1 | 7/2006 | Beeson | |
| 2006/0274032 A1* | 12/2006 | Mao | A63F 13/06 |
| | | | 345/156 |
| 2006/0280339 A1 | 12/2006 | Cho | |
| 2008/0028231 A1 | 1/2008 | Bender | |
| 2008/0209229 A1 | 8/2008 | Ramakrishnan et al. | |
| 2009/0134972 A1 | 5/2009 | Wu, Jr. et al. | |
| 2009/0262074 A1* | 10/2009 | Nasiri | G06F 1/1626 |
| | | | 345/158 |
| 2012/0051605 A1* | 3/2012 | Nagar | G06K 9/00389 |
| | | | 382/124 |
| 2012/0098750 A1 | 4/2012 | Allen et al. | |
| 2013/0111580 A1* | 5/2013 | Checco | G06F 21/32 |
| | | | 726/19 |
| 2013/0265218 A1* | 10/2013 | Moscarillo | G06F 3/04886 |
| | | | 345/156 |
| 2013/0347099 A1 | 12/2013 | Smith | |
| 2014/0215550 A1* | 7/2014 | Adams | G06F 21/316 |
| | | | 726/1 |
| 2014/0310804 A1* | 10/2014 | Apostolos | H04L 63/0861 |
| | | | 726/19 |
| 2016/0253486 A1 | 9/2016 | Sarkar et al. | |
| 2016/0292410 A1* | 10/2016 | Lu | G06F 21/32 |
| 2016/0364558 A1 | 12/2016 | Rome et al. | |
| 2020/0057706 A1 | 2/2020 | Rome et al. | |

OTHER PUBLICATIONS

U.S. Appl. No. 15/248,174, U.S. Pat. No. 10,229,255 filed Aug. 26, 2016, User Authentication.
U.S. Appl. No. 16/267,723, filed Feb. 5, 2019, User Authentication.
U.S. Appl. No. 16/544,397, filed Aug. 19, 2019, User Effort Detection.
U.S. Appl. No. 15/134,348, U.S. Pat. No. 10,235,507 filed Apr. 20, 2016, Authentication Via Typing Cadence, Gestures, & QR Codes.
"U.S. Appl. No. 14/052,562, Non Final Office Action dated Dec. 31, 2014", 22 pgs.
"U.S. Appl. No. 14/052,562, Response filed Jan. 13, 2015 to Non-Final Office Action dated Dec. 31, 2014", 11 pgs.
"U.S. Appl. No. 14/052,562, Non Final Office Action dated Apr. 6, 2015", 6 pgs.
"U.S. Appl. No. 14/052,562, Amendment and Response filed Aug. 6, 2015 to Non-Final Office Action dated Apr. 6, 2015", 22 pgs.
"U.S. Appl. No. 14/052,562, Final Office Action dated Oct. 15, 2015", 23 pgs.
"U.S. Appl. No. 14/052,562, Response filed Mar. 15, 2016 to Final Office Action dated Oct. 15, 2015", 13 pgs.
"U.S. Appl. No. 14/052,562, Notice of Allowance dated May 24, 2016", 10 pgs.
"U.S. Appl. No. 15/248,174, Non Final Office Action dated Apr. 6, 2017", 13 pgs.
"U.S. Appl. No. 15/248,174, Response filed Oct. 5, 2017 to Non Final Office Action dated Apr. 6, 2017", 13 pgs.
"U.S. Appl. No. 15/248,174, Final Office Action dated Nov. 21, 2017", 19 pgs.
"U.S. Appl. No. 15/134,348, Non Final Office Action dated Dec. 4, 2017".
"U.S. Appl. No. 15/248,174, Response filed Jan. 26, 2018 to Final Office Action dated Nov. 21, 2017", 17 pgs.
"U.S. Appl. No. 15/134,348, Response filed Apr. 4, 2018 to Non Final Office Action dated Dec. 4, 2017", 13 pgs.
"U.S. Appl. No. 15/248,174, Non Final Office Action dated May 14, 2018", 16 pgs.
"U.S. Appl. No. 15/134,348, Final Office Action dated Jul. 16, 2018", 19 pgs.
"U.S. Appl. No. 15/248,174, Response filed Aug. 14, 2018 to Non Final Office Action dated May 14, 2018", 16 pgs.
"U.S. Appl. No. 15/134,348, Response filed Sep. 17, 2018 to Final Office Action dated Jul. 16, 2018", 14 pgs.
"U.S. Appl. No. 15/134,348, Advisory Action dated Sep. 28, 2018", 3 pgs.
"U.S. Appl. No. 15/248,174, Notice of Allowance dated Oct. 17, 2018", 9 pgs.
"U.S. Appl. No. 15/134,348, Notice of Allowance dated Oct. 30, 2018", 5 pages.
Chok, Nian Shong, "Pearson's Versus Spearman's and Kendall's Correlation Coefficients for Continuous Data", Masters Thesis, University of Pittsburgh, (2010), 53 pgs.
Ghali, S, "Introduction to Geometric Computing", Chapter 13, (2008), 143-147.
Joyce, R., "Identity Authentication Based on Keystroke Latencies", Communications of the ACME, vol. 33, No. 2, (Feb. 1990), 168-176.
Kang, P, "Continual Retraining of Keystroke Dynamics Based Authenticator", In: Lee SW., Li S.Z. (eds) Advances in Biometrics. ICB 2007. Lecture Notes in Computer Science, vol. 4642. Springer, Berlin, Heidelberg., (2007), 9 pgs.
Mandujano, S, "Deterring Password Sharing: User Authentication via Fuzzy c-Means Clustering Applied to Keystroke Biometric Data.", Proceedings of the Fifth Mexican International Conference in Computer Science (ENC'04)., (2004), 7 pgs.
Monrose, F., "Keystroke dynamics as a biometric for authentication", Future Generation Computer Systems, 16, (2000), 351-359.
Weisstein, Eric W, "Barycentric Coordinates", From MathWorld-A Wolfram Web Resource, Online Retrieved from the internet:http: mathworld.wolfram.com BarycentricCoordinates.html, (Oct. 9, 2018).
Wikidiff, "Centroid vs Barycenter—What's the difference", [Online] Retrieved from the internet:https: wikidiff.com barycenter centroid, (Oct. 9, 2018).
Wikipedia, "Centroid", Wikipedia contributors, The Free Encyclopedia, [Online] Retrieved from the internet:https: en.wikipedia.org w index.php?title=Centroidandoldid=862297606, (Oct. 9, 2018).
Wikipedia, "Barycenter", Wikipedia contributors, The Free Encyclopedia, [Online] Retrieved from the internet:https: en.wikipedia. org w index.php?title=Barycenterandoldid=860897006, (Oct. 9, 2018).

* cited by examiner

FIG. 2

AUTHENTICATION VIA TYPING CADENCE, GESTURES, AND QR CODES

CLAIM OF PRIORITY

This patent application is a Continuation of U.S. patent application Ser. No. 15/134,348, filed on Apr. 20, 2016, which claims the benefit of priority under 35 U.S.C. § 119(e) to U.S. Provisional Patent Application Ser. No. 62/150,213, filed on Apr. 20, 2015, each of which are hereby incorporated by reference herein in their entireties.

CROSS-REFERENCE TO RELATED PATENT DOCUMENTS

This patent application is also related to U.S. patent application Ser. No. 15/248,174, titled "User Authentication," filed on Aug. 26, 2016; U.S. patent application Ser. No. 14/052,562, titled, "User Authentication via Input of Known Text," filed on Oct. 11, 2013; and to U.S. Provisional Patent Application Ser. No. 61/712,718, titled, "System and Method to Differentiate Input Device Users," filed on Oct. 11, 2012, each of which are hereby incorporated by reference herein in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, Intensity Analytics, Inc. All Rights Reserved.

BACKGROUND

As people's work and personal lives become increasingly dependent upon computing devices and information networks, authenticating users who seek to access computing devices, computer networks, and computer services becomes increasingly important.

BRIEF DESCRIPTION OF THE DRAWINGS

Some embodiments are illustrated by way of example and not limitation in the various figures provided in-line with the text and in the figures of the accompanying drawings, in which:

FIG. 2 illustrates a visual output including an example table that displays data of performance metrics created during the process of evaluating the challenge phrase against the user's PCCHL, according to an embodiment;

DETAILED DESCRIPTION

Figure 1A:
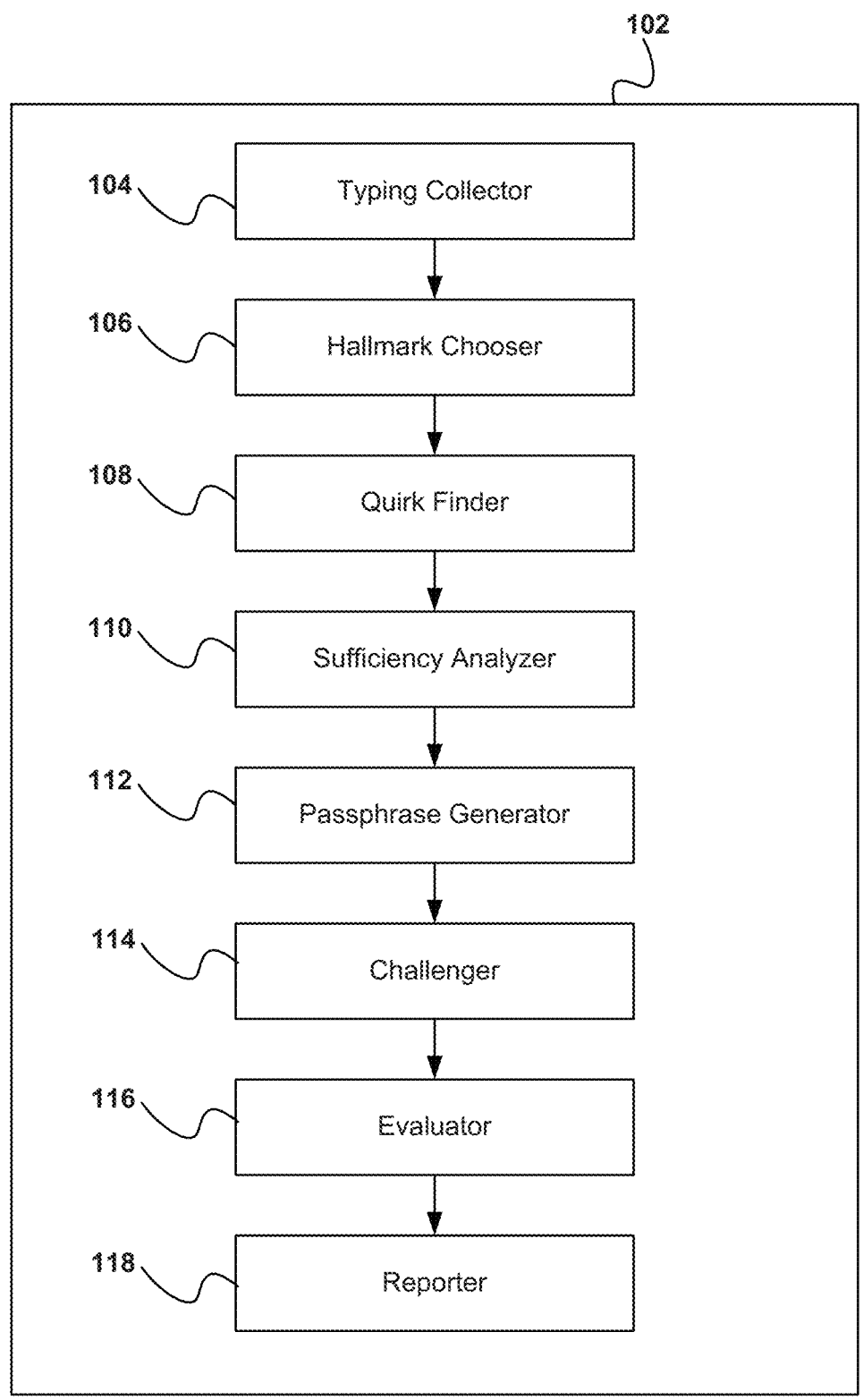
FIG. 1A illustrates components of the Passphrase system, according to an embodiment.

The present disclosure describes techniques for user authentication via typing cadence, gestures, and QR codes. In the following detailed description, for purposes of explanation, numerous specific details are set forth in order to provide a thorough understanding of the various aspects of the presently disclosed subject matter. However, it will be evident to those skilled in the art that the presently disclosed subject matter may be practiced without these specific details. In other instances, well-known methods, procedures, and components have not been described in detail so as not to obscure the presently disclosed subject matter.

Passphrase

Classic passwords (e.g., passwords that a user must remember in order to be authenticated or to be granted access to a secured resource) may be discovered by others, may be inferred from widespread/repeated use in quasi-public social environments (e.g., social media sites), or may otherwise be obtained through hacking or some other illegal process. Password restriction is the practice of enforcing rules regarding password length and the use of special characters and punctuation marks in passwords. User frustration increases with password complexity, but less so with password length. Although well intended, complicated passwords and elaborate password expiration schedules do not increase security. A password consisting of a string of meaningful words is called a "passphrase." Passphrases reduce the weaknesses of classic passwords by making the string harder to crack (e.g., "guess") and by reducing user frustration with complex passwords.

Despite proclamations of the death of passwords, strong resistance remains to abandoning passwords altogether. A better solution to dealing with the weaknesses of classic passwords is by not requiring a user to remember the user's password, but instead to require the user to enter a usefully random password that is dynamically generated at the time of use (access), and which is then discarded. However, how can a user type such a "password" without knowing, a priori, what to type?

Passphrase is software that learns the user's finger movements over a keyboard during typing efforts and stores this information into a previously collected cadence and habit library ("PCCHL", as defined in U.S. patent application Ser. No. 14/052,562, titled, "User Authentication via Input of Known Text," filed on Oct. 11, 2013) associated with the user. The efforts within the PCCHL are analyzed for patterns, and muscle movement patterns of the user that are either predictably consistent or predictably inconsistent are identified. Passphrase then generates English (or any other language) phrases that feature one or more of the user's hallmarks, which are groups of characters of varying lengths that the user types accurately, consistently, and frequently, and which are reliably descriptive of the way that particular user types. Using a sentence construction engine and the generated phrases featuring the user's hallmarks, Passphrase creates a one-time authentication challenge (e.g., a short phrase or sentence) comprising a set of one or more generated phrases featuring the user's hallmarks. Passphrase prompts the user to type the one-time authentication challenge text and then compares the efforts, which the user expended in typing the one-time authentication challenge, to correlated effort metrics in the PCCHL associated with the user to determine whether the two sets of efforts statistically match.

By examining only the metrics of a user's typing efforts, which are stored in the user's PCCHL, Passphrase eliminates the requirements and weaknesses of classic passwords (e.g., a user having to remember a particular password). Because a generated passphrase expires after a single authentication, the generated passphrase is of no value in subsequent authentications, and thus does not need to be remembered nor kept secret. Furthermore, a generated passphrase may be set to expire as a function of time, thus further securing the generated passphrase.

The entries in a user's PCCHL may accumulate over time and reflect a capture process, which focuses on a consistent style of typing (e.g., the user's typing when using a particular program or particular type of program, such as Microsoft's Word and Outlook vs. Excel or some form-based program). Passphrase may access the user's PCCHL, and may compare the typing metrics in the one-time authentication challenge to corresponding typing metrics in the PCCHL, and may return a result (e.g., renders an opinion or a value) as to their similarity. Supplemental information in the result may indicate a quality of the statistics, so that a host device may take appropriate action based on at least one of the host device's risk tolerance, the sensitivity of the app, data, or process that is being protected, or other business rule considerations. In some example embodiments, after only a short period of deployment, the PCCHL will have sufficient usable data, thereby enabling Passphrase to generate a nearly limitless variety of confected sentences.

Some host devices may episodically use this one-time authentication challenge capability in connection with a specific request to secure data, a process, or an app. The host device may require a user to authenticate via the one-time authentication challenge, which may be set to appear at any time in any program, before launching a new app, or before exposing confidential data. Passphrase may communicate over web services and may present standard component-style interfaces for integration into existing software.

A user need not formally enroll into Passphrase. In fact, a user need not change the user's normal program/app usage. Passphrase inconspicuously tracks the user's typing behavior and stores the relevant metrics in the user's PCCHL.

FIG. 1A illustrates components of the Passphrase system 102, according to an embodiment. Passphrase 102 may be comprised of eight components: (1) a typing collector 104, (2) a hallmark chooser 106, (3) a quirk finder 108, (4) a sufficiency analyzer 110, (5) a passphrase generator 112, (6) a challenger 114, (7) an evaluator 116, and (8) a reporter 118.

(1) Typing Collector

The Typing Collector obtains metrics about the physical activity involved in a user touching keys on a keyboard. In an embodiment, the Typing Collector does not capture any content (e.g., Typing Collector stores no source text), thus, Typing Collector does not create privacy concerns. The Typing Collector may run as a standalone program, which may be activated whenever a user's PCCHL needs to be created or modified. A PCCHL is unique to a particular user because a PCCHL contains captured identifying behavior patterns, which are unique to each person. The Typing Collector may run as an installed application, or it may run as a web application. In general, latency from a slow Internet connection does not cause difficulties for Passphrase. The metrics that Passphrase uses may be captured by the Typing Collector. These metrics may include a) 100 ns timestamps associated with the KeyPress, KeyDown, and KeyUp events, b) a hashed representation of various groups of characters in text (e.g., the "hallmarks") that compose the words, and c) selected text or typing activity surrounding the words that the user typed. The Typing Collector may also note the position of each hallmark within words and sentences, along with overall information about the speed at which each hallmark was typed. The Typing Collector may also collect intra-sample timing "overlaps," which occur during the actuation cycles of temporally adjacent keystrokes, and the status of the "PNACS keys" (the Caps Lock key, the Num Lock key, the Alt key, the Control key, and the Shift key).

(2) Hallmark Chooser

Theoretically, a large number of potential hallmarks may be associated with every typing sample. A hallmark may be an n-length string of characters selected because of the distinctive behavioral effort involved in typing the hallmark. Hallmarks may overlap each other.

The entire collection of hallmarks represents a rich source of data for mining users' personal typing patterns. For example, the five character string "ABCDE" (unrealistically short, of course, but used here only as an example) may have one or more of these 15 candidate hallmarks: A, B, C, D, E, AB, BC, CD, DE, ABC, BCD, CDE, ABCD, BCDE, and ABCDE itself. When data from PNACS keys' movements as well as preceding and trailing characters is included, the number of potentially usable hallmarks may become quite large. The Hallmark Chooser may use one or more of several filtering algorithms to select reliably coherent, as well as reliably incoherent, strings—those strings, which occur with sufficient frequency that a reasonable number of them may be fairly anticipated to occur in a normally-typed sample of a user's totality of typing, assuming that a reasonable amount of text exists in the total population of typed characters. The ratio of the number of reliable hallmark samples compared to the total character count in the entire population of typing may form the primary basis for the designation of a character group as being a statistically usable hallmark.

The Hallmark Chooser may use a sentence construction engine, which may have a vocabulary of over 800,000 nouns, verbs, adjectives, and adverbs, as well as selected other parts of speech, to choose hallmarks. The Hallmark Choose may also have zero or more of the following features:

- anonymous personalization
- counterculture to current trend to randomize passwords and make them complicated
- uses logic to select what is ideal in Passphrase to validate
- chooses phrases from rosters of popular sayings
- varies the length of the word and the number of repetitions to hone the answer
- accidental key repeat auto-press
- computes implied finger travel from timings of long-run pairs
- timings of hyphens and semi-colons included
- keyboard travel speed to see what is impossible/improbable for single-finger typists
- includes length of key hold
- includes timings for overlap/shift—tied into finger travel
- propensity to use Caps Lock for long-capped strings
- space surrounding timings
- space timings (3) Quirk Finder A quirk is a spurt of typing that a user performs consistently, frequently, and that has resulted in errors or were executed at significantly varying speeds.

The Quirk Finder searches text looking for elusive quirks—mistake strings which are frequent and significant enough to merit being cataloged as idiosyncratic. In contrast to the Hallmark Chooser, which strives to find as many hallmarks as possible, the Quirk Finder is much more selective because a normal user typing normally is believed to intend accuracy, whereas quirks represent finger movement failures, which a normal user is believed to intend to minimize. Hence, the probability of the occurrence of quirks is relatively lower than for hallmarks. Furthermore, the probability of encountering a quirk during the typing of a short-burst challenge phrase is low. Since Passphrase is concerned with distinguishing the cadence of typing efforts (rather than identifying the letters) in text patterns, should quirks occur in the overall user-typed character population, and also occur during the creation of the challenge phrase, that fact would be particularly significant.

(4) Sufficiency Analyzer

The purpose of the Sufficiency Analyzer is to calibrate the adequacy of the source text composing the PCCHL for use in reporting the statistical probability of a match between the PCCHL text and the text that the user types in the challenge phrase.

The Sufficiency Analyzer addresses two foundational requirements concerning the statistics of probability: (1) truly random sampling, and (2) having enough data.

The Sufficiency Analyzer also investigates the following potential problem areas in the PCCHL that might affect the usability of the results:

- Failed collection plan and/or collection circumstances.
- Differing nature of the designated PCCHL text. Ideally, the same source application type (e.g., Microsoft Outlook) would be designated for the PCCHL text, although applications that have the same basic typing behavior (e.g., Microsoft Outlook and Microsoft Word) will also work.
- A full range of characters is preferred (unlike Microsoft Excel, which normally has mostly numbers).
- Special characters are ignored (e.g., function keys, numeric keypad, etc.)
- Measuring text metrics entropy. An infinite amount of typing over an infinite amount of time produces unremarkable (e.g., non-user-defining) data. Not enough typing causes the statistics to fail, whereas too much typing causes the data to fail. The Sufficiency Analyzer searches for this "Goldilocks Zone."

(5) Passphrase Generator

Hallmarks are more often letter groups than complete words. A challenge phrase is composed of an easy-to-type noun-verb-object text string, which makes it easy for the user to type the challenge in a natural way (e.g., without having to pause to remember a complicated series of words, or to have to memorize complex strings of characters which are not words and thus require the effort of thinking in addition to the reflexive, mostly involuntary effort of habitual typing.) Passphrase's typical operating mode is to measure keyboard effort, not the identity (e.g., accuracy) of characters typed. Using the sentence construction engine, Passphrase randomly selects whole words that feature a user's hallmarks, deploying them in a corresponding sequential position according to metrics of the user's PCCHL. For example, if a hallmark was "gh" and located in a word-ending position (i.e., at the end of a word), then words like "cough," "enough," "breakthrough," "thorough," "laugh," etc., words with similar endings, or words that contain a positional variation (e.g., "ghost"), would be candidates for a challenge phrase. The Passphrase generator may propound a variety of short, everyday-like sentences using hallmarks, unknown to the user, to sift effort metrics. The Passphrase generator may also generate non-hallmark-bearing phrases, for example when multiple challenges are warranted.

(6) Challenger

The Challenger requests everyday-style sentences from the Passphrase generator. The user is presented (e.g., visually on a display, aurally by playing the sentence aloud through a text-to-speech system, etc.) with the random sentence(s) and asked to type the presented random sentence(s). The Challenger may have a set of "guardrail" rules, so that the Challenger has the ability to reject typing efforts before they are submitted to the Evaluator. The Challenger records both the hallmark and quirk metrics of the user's typing efforts and passes them to the Evaluator for statistical evaluation.

(7) Evaluator

The Evaluator compares the metrics returned by the Challenger to the associated metrics in the PCCHL, attempting to match hallmarks using various statistical techniques.

In an embodiment, both the challenge phrase and the associated PCCHL metrics must each successively meet these statistical tests: (the italicized adjectives below are subject to tuning parameters):

There must be enough source characters in each sample. Since the Passphrase Generator will create the challenge phrase, this will normally be the case.

Intra-sample hallmark consistency is required. Less than 20% of all hallmark candidates will be used (although this threshold is tunable by the host app). The availability of quirks is a function of the user's typing—no typing mistakes equals no quirks. Catching a matching quirk is a significant statistical plus.

There must be enough qualifying hallmarks in each sample. By definition, the challenge phrase has hallmarks; also by definition, the PCCHL has those same hallmarks (this is required to create the challenge phrase in the first place). However, the hallmarks must be typed with an effort close enough to the expected pattern to qualify.

Qualifying hallmarks must represent a sufficient percentage of the overall typing in each sample.

There must be enough overlapping qualifying hallmarks between the sample phrase and the PCCHL.

There must be sufficient combined hallmarks as a percentage of overall challenge size.

(8) Reporter

The Reporter assesses the results returned by the Evaluator. The Reporter may be programmed to: (1) reject results conclusively, (2) require another challenge phrase effort, possibly with a longer challenge phrase; or (3) start the process over again. The results are returned with numerical and/or graphical information to assist the host application in determining a probability that the typist who typed the challenge phrase is the same person who created the host-selected PCCHL.

Figure 1B:
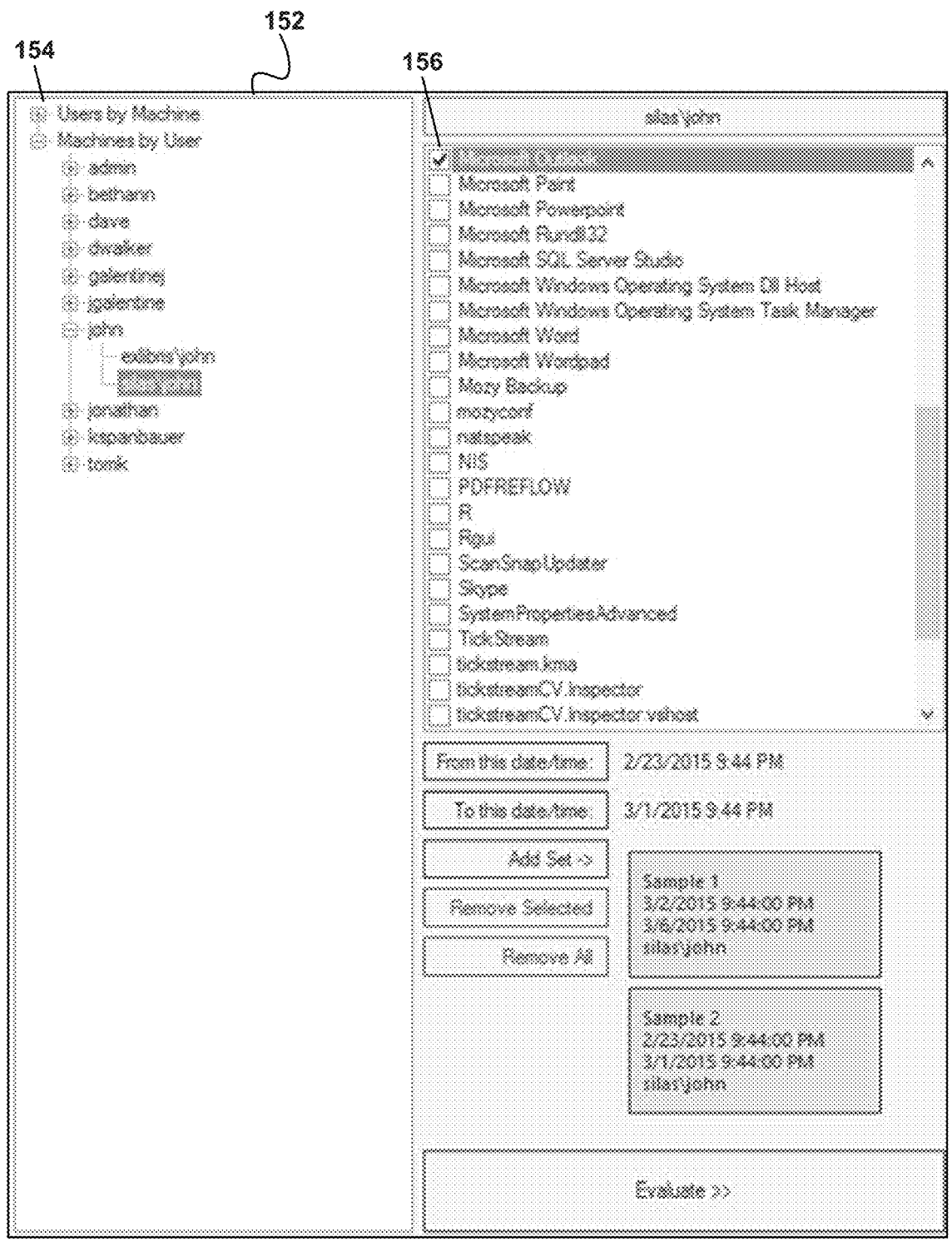
FIG. 1B illustrates a user interface (UI) control that may be used to designate the previously collected cadence and habit library (PCCHL) text source(s) to be used and display an overview of data collected during a typing collection session, according to an embodiment

FIG. 1B illustrates a user interface (UI) control 152 that may be used to designate the PCCHL text source(s) to be used and display an overview of data collected during a typing collection session, according to an embodiment. The tree control 154 on the left may be used to select a user/machine combination, which causes a list of Checkboxes to be displayed on the right. Each Checkbox represents an application that has executed on the user/machine combination while the Typing Collector was active.

FIG. 2 illustrates a visual output 200 including an example table 202 that displays data of performance metrics created during the process of evaluating the challenge phrase against the user's PCCHL, according to an embodiment. Many of these data, particularly the Empirical Mode Decomposition (EMD) percentages, are single-number indicators of a likely match.

Figure 3:
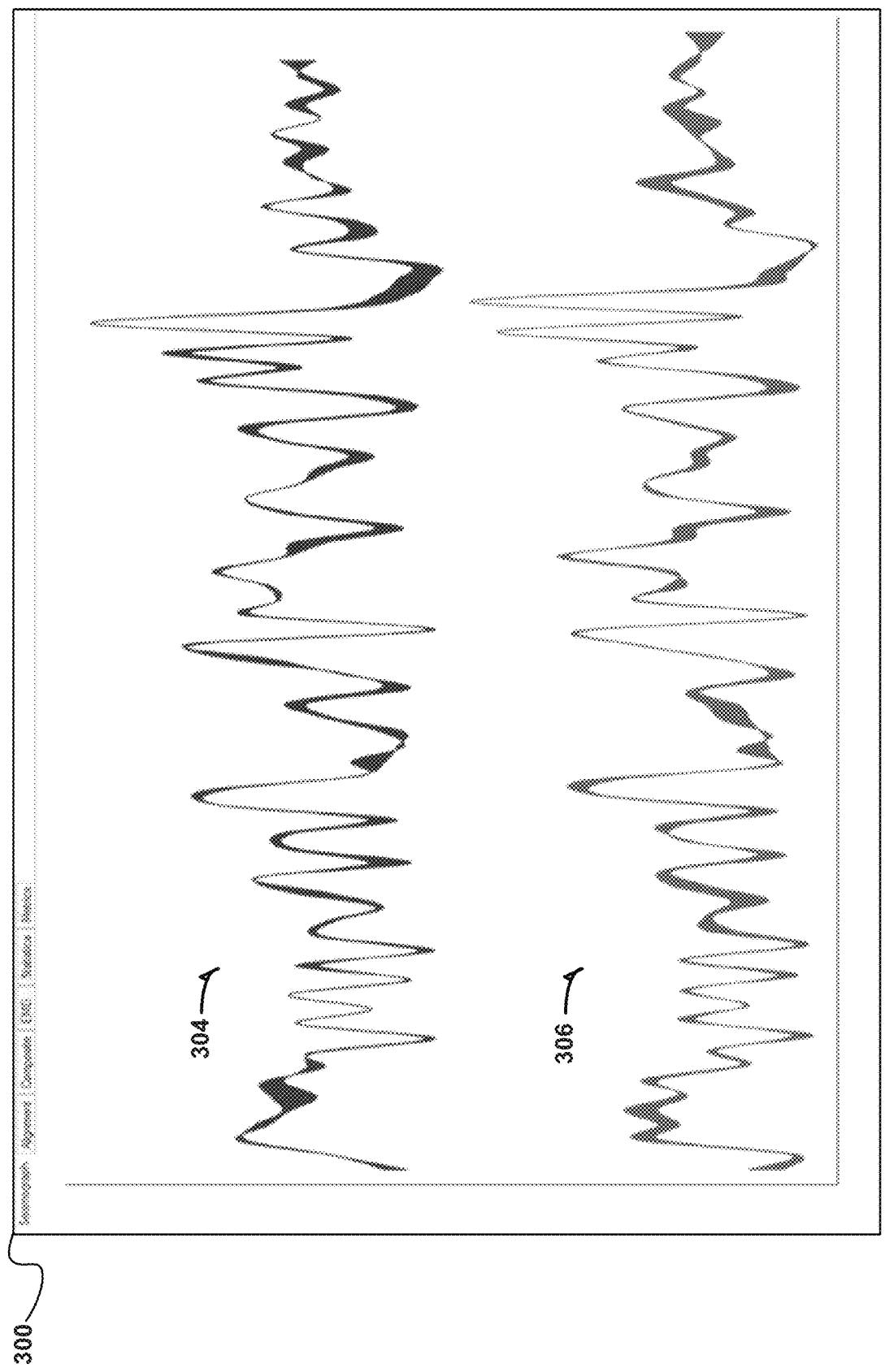
FIG. 3 illustrates a visual output including a graph of hallmarks, according to an embodiment.

FIG. 3 illustrates a visual output 300 including a graph 302 of hallmarks, according to an embodiment. The graph 302 displays the behavior patterns across the most significant hallmarks encountered in the challenge phrase sample and the PCCHL as lines 304, 306, respectively. Although lines 304, 306 will almost never be identical, even a brief glance at these two lines 304, 306 suggests that they reflect typing efforts of the same person.

Figure 4:
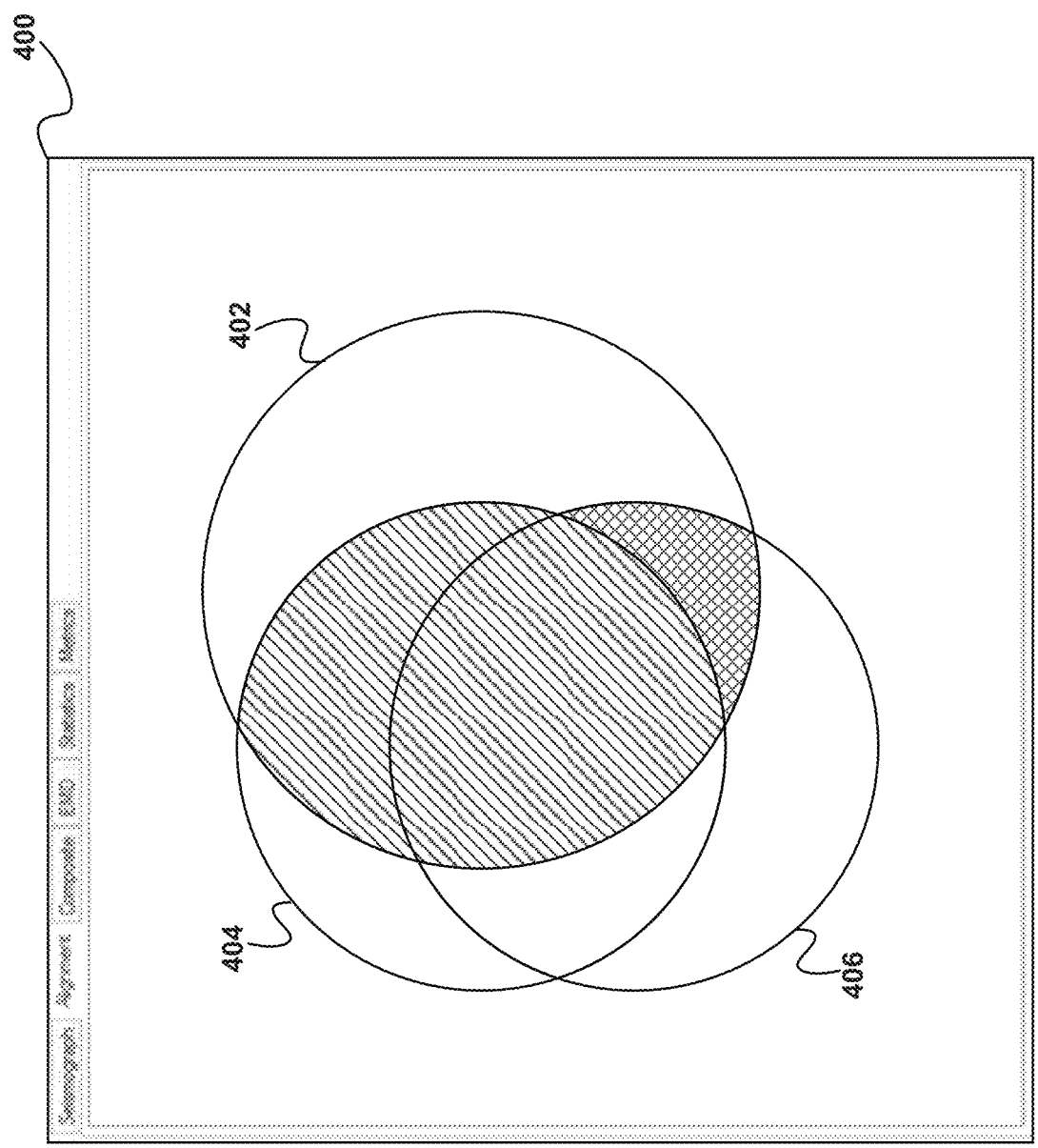
FIG. 4 illustrates a visual output including an alignment graph displaying overlap between a challenge phrase and a PCCHL, according to an embodiment.

FIG. 4 illustrates a visual output 400 including an alignment graph 400 displaying overlap between a challenge phrase and a PCCHL, according to an embodiment. Circle 402 reflects the total number of candidate hallmarks, circle 404 reflects the number of hallmarks in the challenge phrase sample, and circle 406 reflects the number of hallmarks in the associated PCCHL. Statistical data may be displayed, such as the percent of the total hallmarks each circle 404, 406 composes and the degree of overlap between circles 404, 406.

Figure 5:
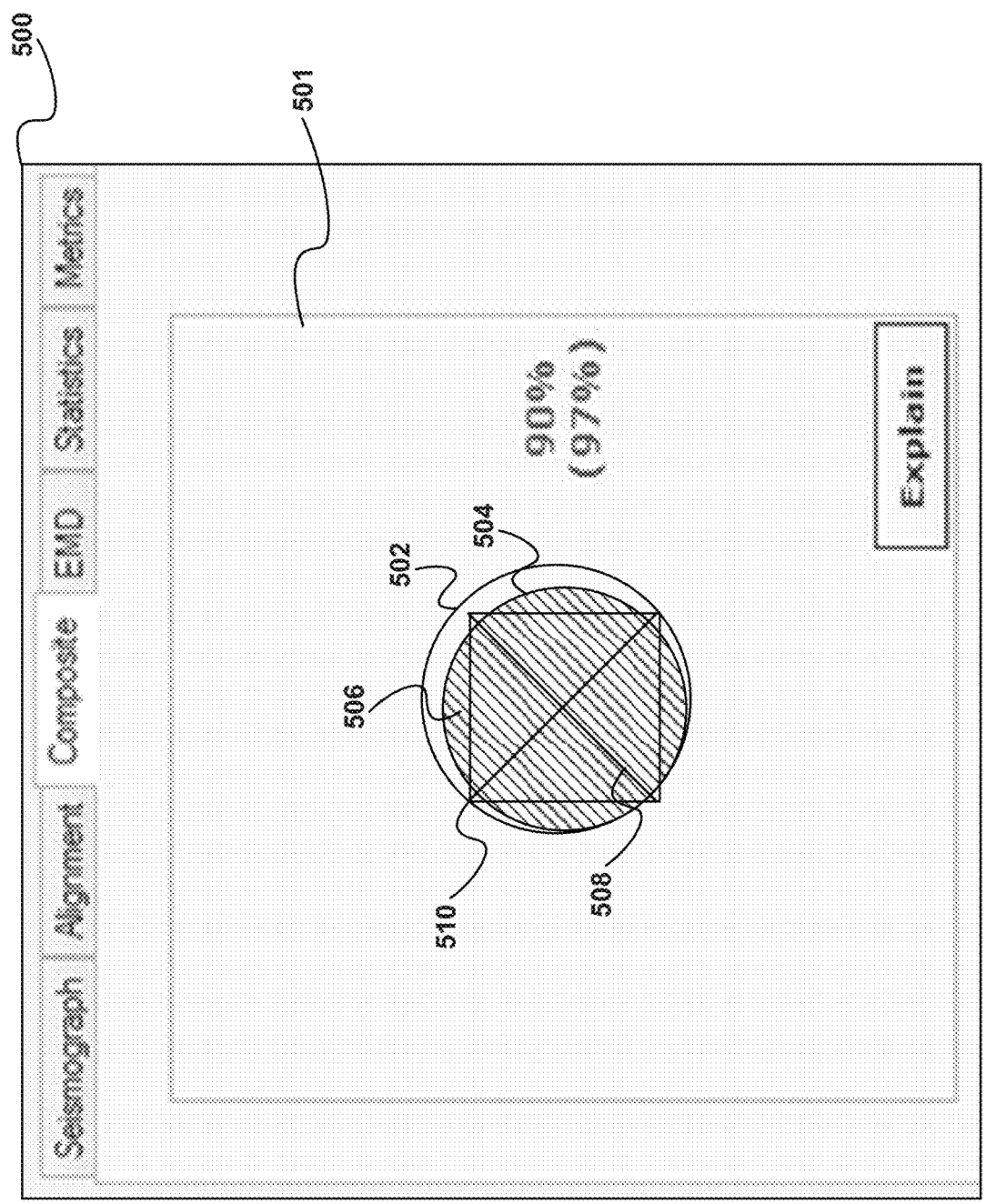
FIG. 5 illustrates a visual output including a composite graphic of graphical elements which, together, visually depict the nature of the match between a challenge phrase sample set and an associated PCCHL, according to an embodiment.

FIG. 5 illustrates a visual output 500 including a composite graphic 501 of graphical elements which, together, visually depict the nature of the match between a challenge phrase sample set and an associated PCCHL, according to an embodiment. Included in the graphic 501 is a first circle 502, a second circle 504, an overlap zone corresponding to the overlap between the first circle 502 and the second circle 504, an X, and a bounding box 510, which may changes in size and/or sheer. There are also two percentages, which depict the results of a series of complicated statistical computations into numbers that are referred to as "fidelity" and "confidence," which are terms that do not correspond to formal definitions in the world of statistics. "Fidelity" and "confidence" should be viewed together. Values for "fidelity" and "confidence" at either end of the 0-100 spectrum reflect reliability, whereas values in the 40-60 range reflect uncertainty.

Figure 6:
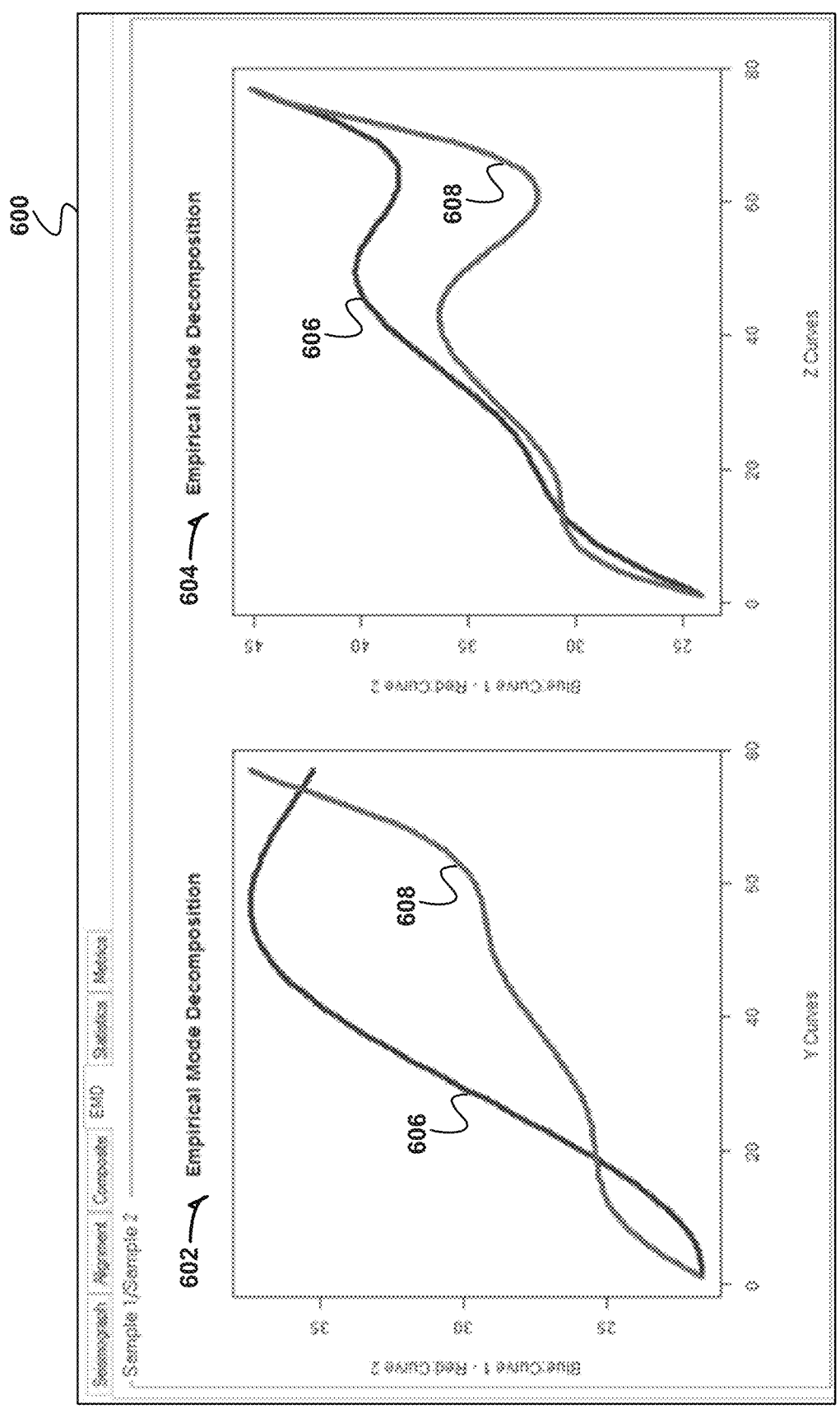
FIG. 6 illustrates a visual output including two respective graphs for the Empirical Mode Decomposition ("EMD") of the challenge phrase and the associated PCCHL, according to an embodiment.

FIG. 6 illustrates a visual output 600 including two respective graphs 602, 604 for the Empirical Mode Decomposition ("EMD") of the challenge phrase and the associated PCCHL, according to an embodiment. The two graphs 602, 604 may be compared visually by using certain statistical smoothing techniques on the challenge phrase data set and the associated PCCHL efforts. These graphs 602, 604 produce "correlation" numbers that are single-number probabilities that the typist who typed the challenge phrase is the same person who created the host-selected PCCHL.

Figure 7A:
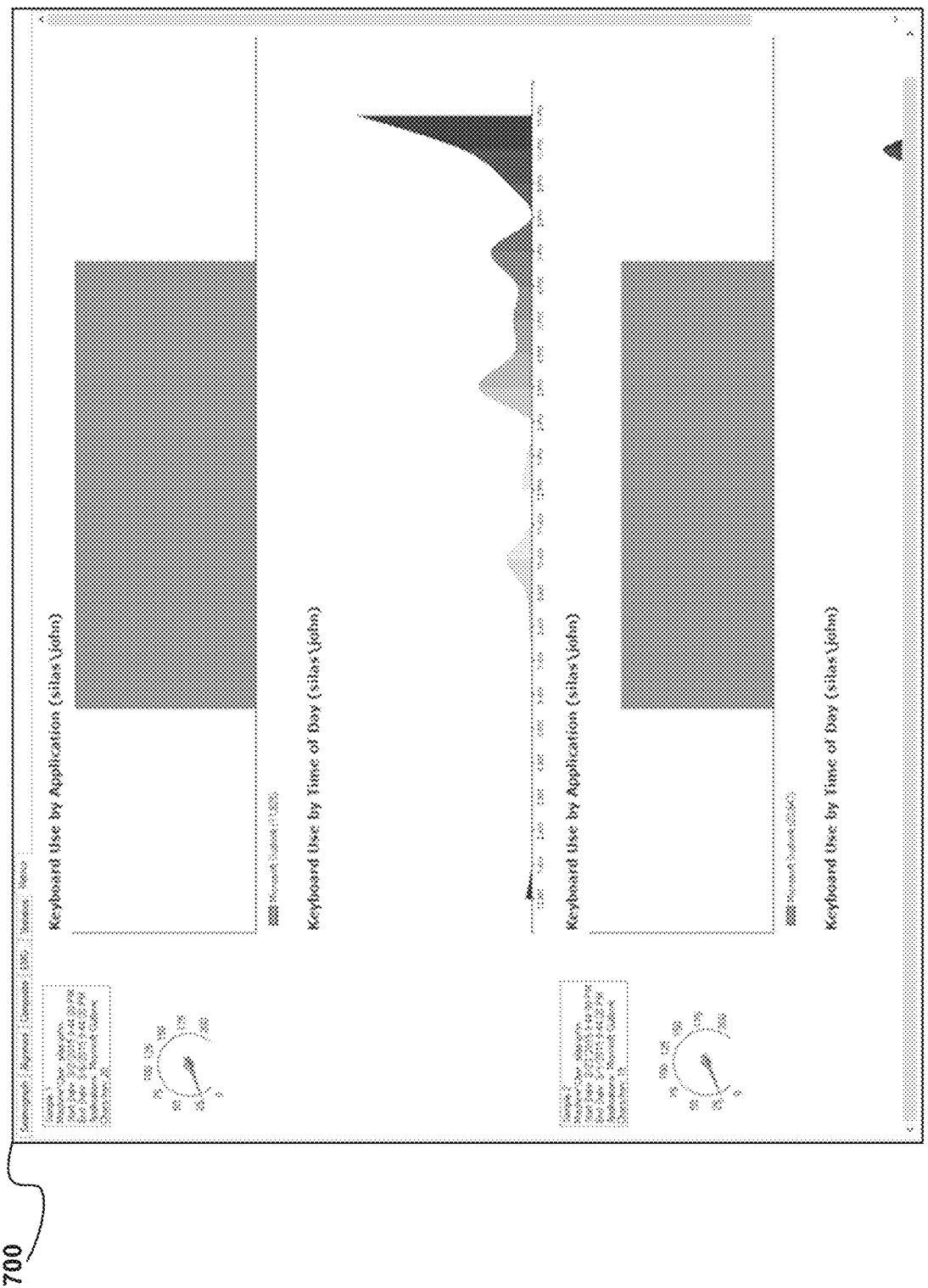
FIG. 7A illustrates a visual output displaying additional statistics produced by the Passphrase system, according to an embodiment.

FIG. 7A illustrates a visual output 700 displaying additional statistics produced by the Passphrase system 102, according to an embodiment. Passphrase 102 may produce statistics that describe many behavioral traits exhibited during the typing of the challenge phrase and the associated PCCHL. For example, FIG. 7 illustrates the display of the overall typing speed and the time of day (on a 24-hour clock), etc.

Figure 7B:
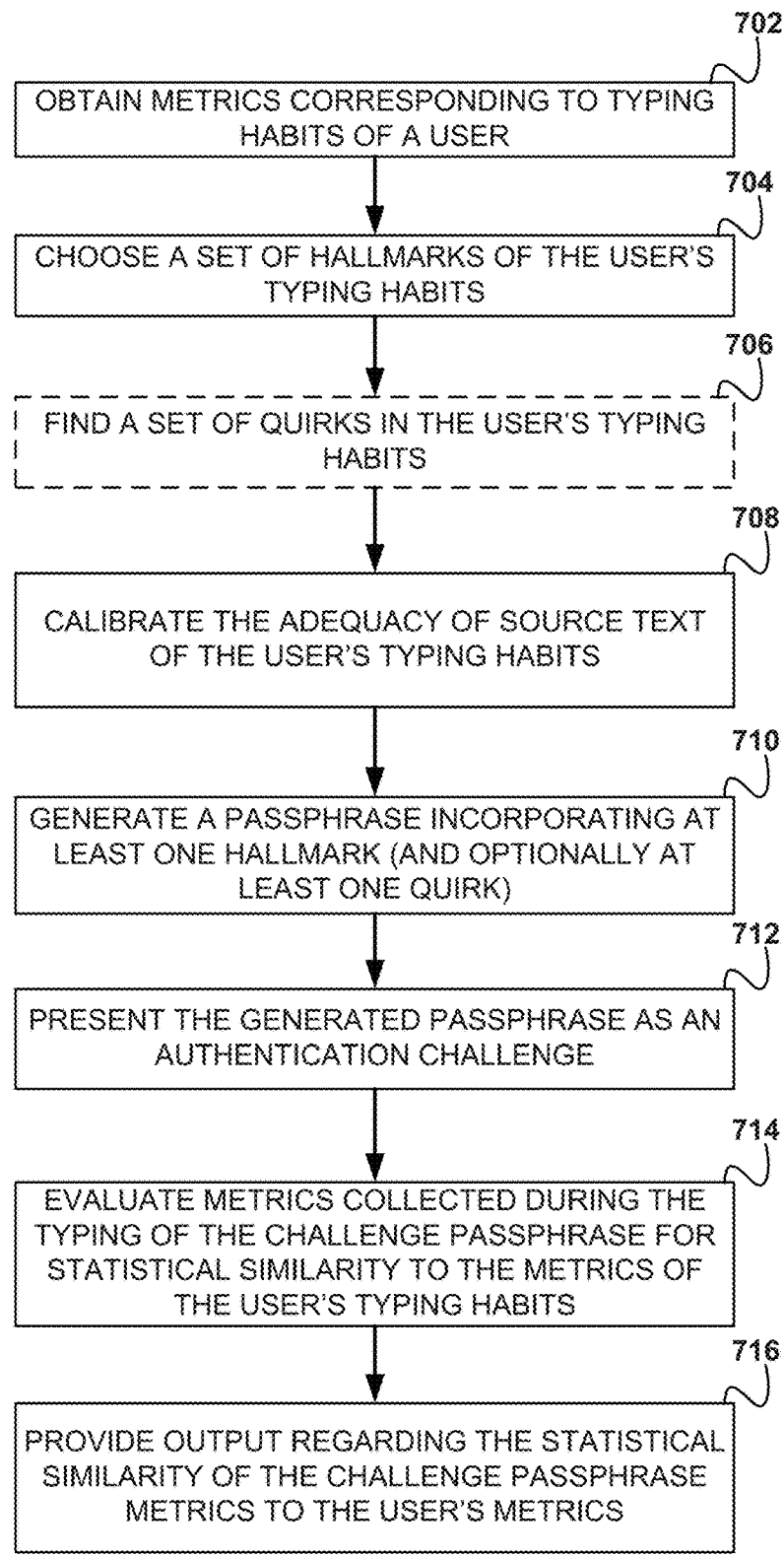
FIG. 7B is a flowchart of a method for user authentication via the Passphrase system, according to an embodiment.

FIG. 7B is a flowchart of a method 701 for user authentication via the Passphrase system, according to an embodiment.

Metrics corresponding to the typing habits of a user are obtained (operation 702).

A set of hallmarks of the user's typing habits are chosen (operation 704).

Optionally, a set of quirks in the user's typing habits are searched for and found (operation 706).

The adequacy of source text (e.g., PCCHL) of the user's typing habits is calibrated (operation 708).

A passphrase is generated incorporating at least one hallmark of the set of hallmarks (operation 710). Optionally, the generated passphrase includes at least one quirk.

The generated passphrase as an authentication challenge (operation 712).

Metrics collected during the typing of the challenge passphrase are evaluated for statistical similarity to the metrics of the user's typing habits (operation 714).

Output regarding the statistical similarity of the challenge passphrase metrics to the user's metrics is provided (operation 716).

Gestures

A growing percentage of the world's commerce is conducted via mobile technology, particularly smartphones. These transactions need to be protected just as much as traditional e-commerce transactions using non-mobile technology. A common approach for securing e-commerce transactions has been to use software-generated, one-time use passcodes. However, one-time use passcodes do not provide true authentication of a person, but rather simply verify a person's possession of a token. Furthermore, automatically generated tokens may be easily intercepted and relayed, for example by malware or man-in-the-middle attacks.

A number of new approaches for securing mobile e-commerce transactions currently exist or are in late-stage development in the market, including (a) simulating numeric keypads with advanced touch-detection electronics, (b) one-time use passcodes sent by text messaging (e.g., SMS), (c) advanced screen components and processing services that may accurately read fingerprints (e.g., "fingerprint scanners"), and (d) drawing pattern recognition. These approaches, however, each have their drawbacks. For example, a drawn pattern may be seen by other people as it is being drawn, either in person or via image capturing equipment (e.g. video cameras), and may be described to others by word-of-mouth. If a drawing pattern is so complicated that it cannot be easily observed or described, then it is likely that the user attempting authentication will have difficulty recreating this drawing pattern dependably, and thus will encounter failure to acquire ("FTA") problems. Conversely, if the pattern is simple, the pattern will be easy for others to replicate, and thus insecure.

The mountains of data—often exceeding 10,000 points from even sketching a simple circle—involved in just one finger movement of an authentication gesture may be successfully processed using the disclosed geospatial/Barycentric techniques that have previously been applied to keyboard typing. The effort of making the drawing is quantified, rather than the visual results/appearance of the drawing. Just as a potential impostor may observe a user typing the user's passcode but cannot physically type the passcode with the same typing cadence as the user (thus rendering moot the potential impostor's knowledge of the user's passcode), a potential impostor may observe a user's gesture, but cannot physically perform the gesture as the user does (thus rendering moot the potential impostor's knowledge of the user's gesture). Similar to using typing cadence versus typed characters for authentication, authentication using gesture efforts versus gesture sketches is a superior approach.

In an embodiment, the gesture authentication capability may be a separate application/app executing on a host device, or may be integrated into other applications/apps executing on the host device. Gesture authentication may be divided into three steps: (1) capturing the gesture metrics; (2) evaluating an instance (e.g., "sketch") for a match against a PCCHL; and (3) reporting statistics of the evaluation to the host device. Deployments of gesture authentication generally fall into one of three scenarios: (1) all components executing on the host device; (2) capturing gesture metrics on the host device and the evaluation process executing remotely, with data exchange occurring via web services; and (3) capturing gesture metrics on the host device, and the evaluation process executing either locally on a PC or remotely on a server.

The enrollment process (e.g., capturing the base metrics for the PCCHL) involves the user first drawing a sample sketch of the sketch the user would like to use for future authentications. As with typing, this sample sketch should reflect comfortable movement by the user and should be simple enough to be remembered by the user. Some users may want to use long/complicated gestures, however, such gestures are not likely to be successful in everyday use; thus, a set of complexity limits may be imposed upon the enrollment process. As with typing, the simpler a gesture is, the better. After the sample sketch has been accepted, the user creates a PCCHL of substantially similar sketches. Each substantially similar sketch in the PCCHL serves as its own "White Hat" test, ensuring that the user can draw the sketch repeatedly and easily by making an acceptably similar effort.

This gesture authentication technique is unique in at least two ways. First, this gesture authentication technique effectively ignores the shape and appearance of the drawing, and instead looks to the effort of creating a similar drawing. Second, this gesture authentication technique processes metrics using a concept found in quantum physics: the graviton. A host device (e.g., a smartphone) during the course of one gesturing effort generates so many numbers across so many different degrees of freedom that the numbers must be processed as assemblages of clusters. Clusters, in turn, are composed of weighted rollups of smaller metrics groups—gravitons. Each "graviton" is composed of the combination of elements $t_0$-X-Y-Z-R-P-Y-La-Lo-Al-V-F-$t_n$ (e.g., start time, X-Axis, Y-Axis, Z-axis, Roll, Pitch, Yaw, Latitude, Longitude, Altitude, Velocity, Force, end time). The "glue" that holds these elements together is evidence of how each element was introduced into the sketch—the process and mechanics of the drawing effort. The proximity of these graviton clusters, coupled with the density of their mass, can be thought of as creating a form of gravity. The stronger the gravity is, the stronger the attraction is . . . and, thus, the stronger the affinity of the effort that created those clusters. Thus, sufficient affinity equals authentication.

This gesture authentication technique offers the benefits of a gradient result, bookended by absolutes, thus providing the host device with the option to permit n number of retries based on how close the drawing effort came to the expected metrics in the PCCHL.

Figure 8:
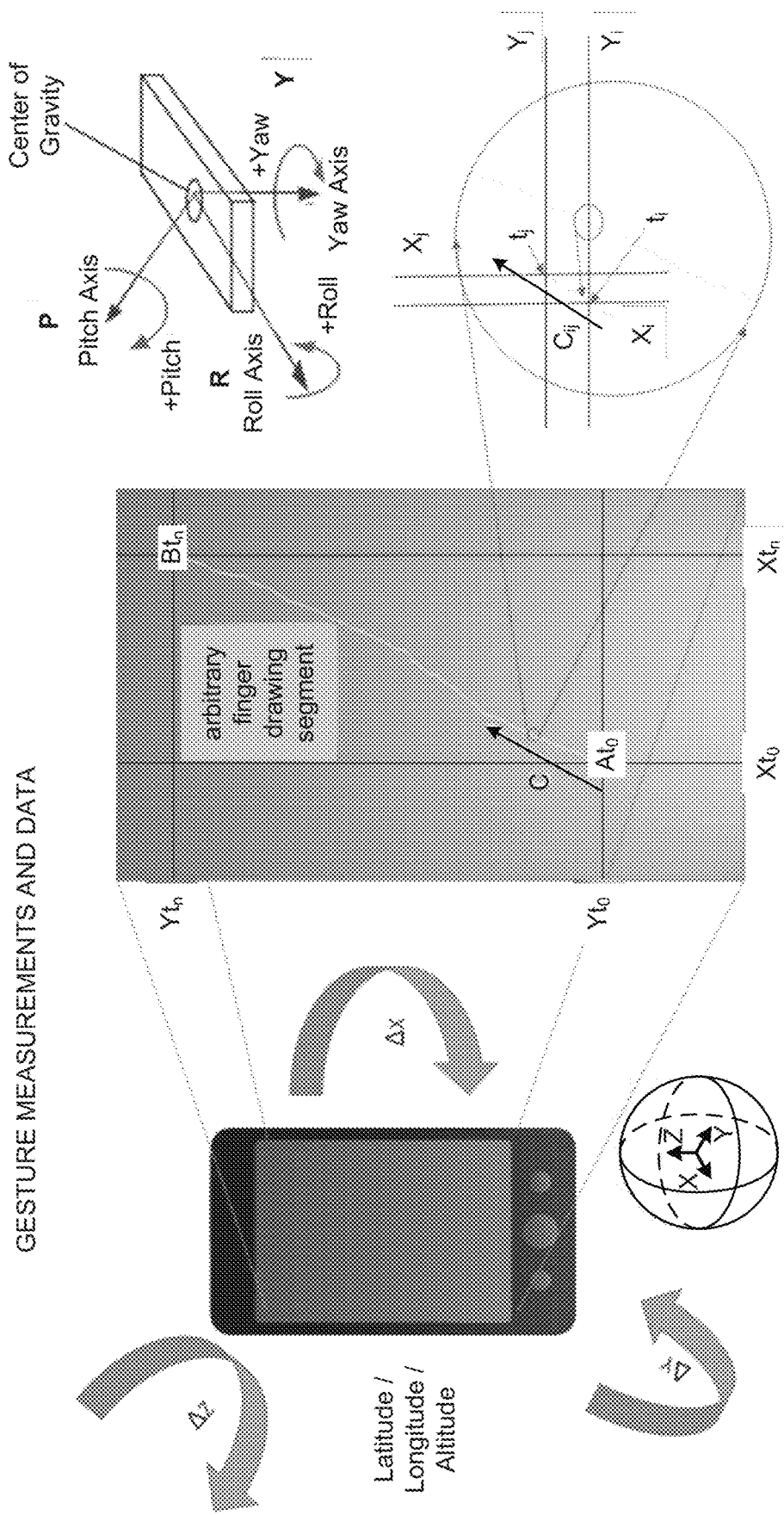
FIG. 8 illustrates some of the metrics collected during a gesture authentication attempt, according to an embodiment.

FIG. 8 illustrates some of the metrics collected during a gesture authentication attempt, according to an embodiment. During the authentication sketch, the gesture authentication technique collects metrics produced by one or more devices integrated within the host device. Examples of such devices include accelerometers, gyroscopes, compasses (e.g., magnetometers), etc. The metrics produced by these devices and collected during the authentication sketch may be used in the evaluation/comparison of the authentication sketch against the PCCHL, and may be determinative of the host's decision whether to authenticate the user drawing the sketch. For example, user A's PCCHL includes metrics that indicate user A holds a smartphone at approximately 350 during user A's authentication sketches. If a user attempting to authenticate as user A did not hold the smartphone at approximately 35° during the user's authentication sketch, the gesture authentication technique may deny access to the user despite the user successfully reproducing user A's authentication sketch.

Figure 9:
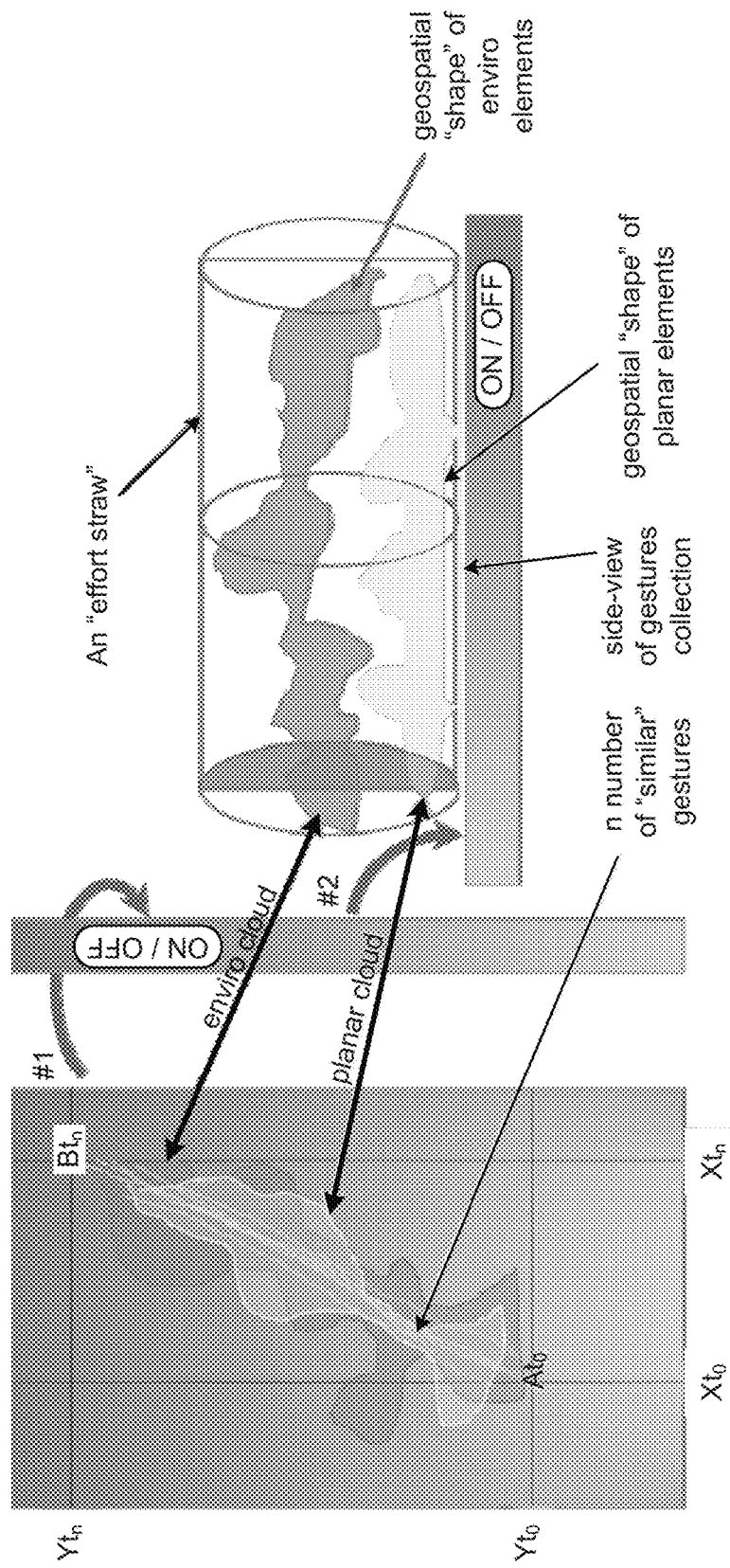
FIG. 9 illustrates converting metrics collected during the gesture authentication attempt into an "effort straw," according to an embodiment.

FIG. 9 illustrates converting metrics collected during the gesture authentication attempt into an "effort straw," according to an embodiment.

Figure 10:
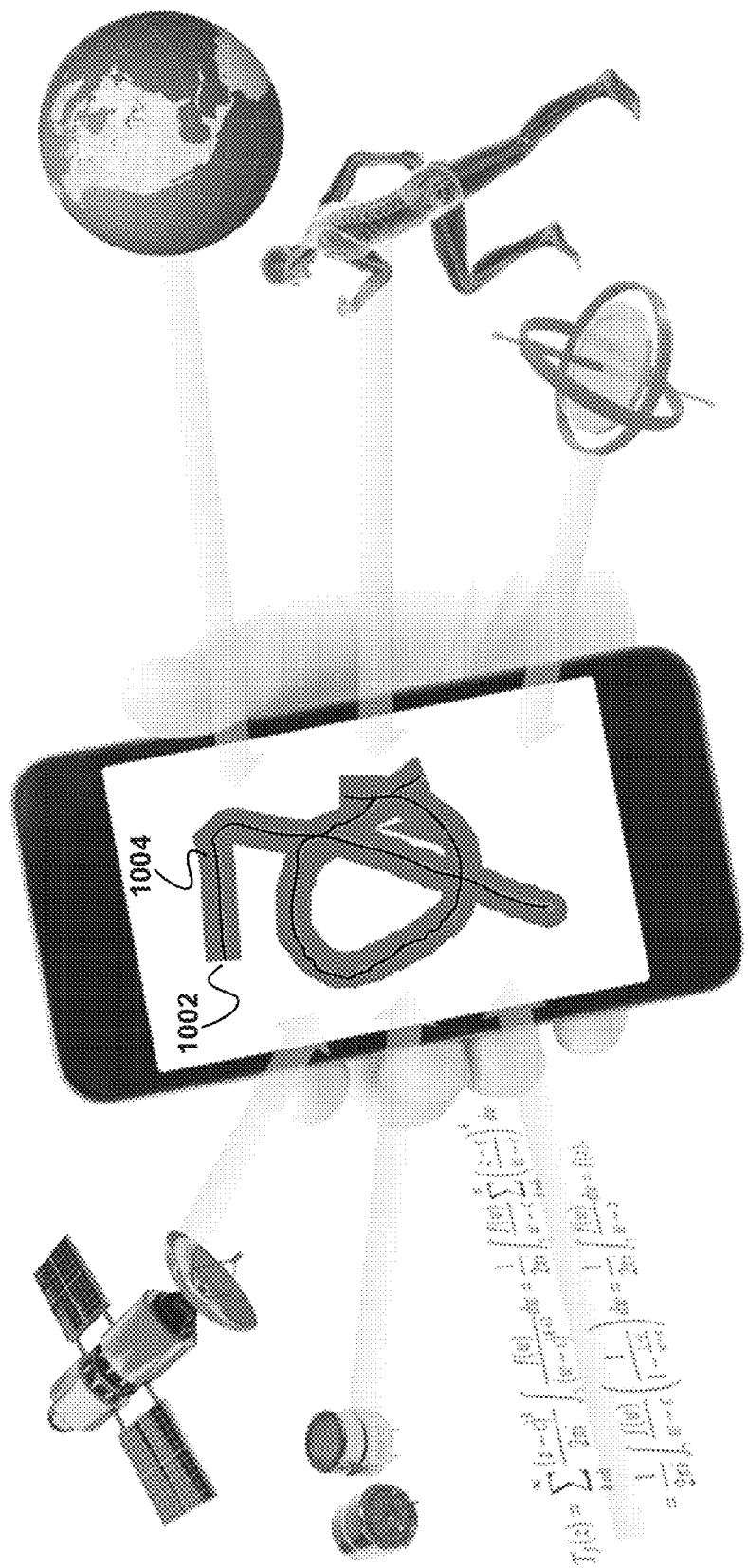
FIG. 10 illustrates a gesture composition during an authentication enrollment of a user, according to an embodiment.

FIG. 10 illustrates a gesture composition during an authentication enrollment of a user, according to an embodiment. The drawn gesture 1002 is the gesture a user entered as the user's unique gesture during enrollment into the gesture authentication system. After entering the drawn gesture 1002, the system calculates the "effort straws" 1004 that correspond to the drawn gesture 1002.

Figure 11:
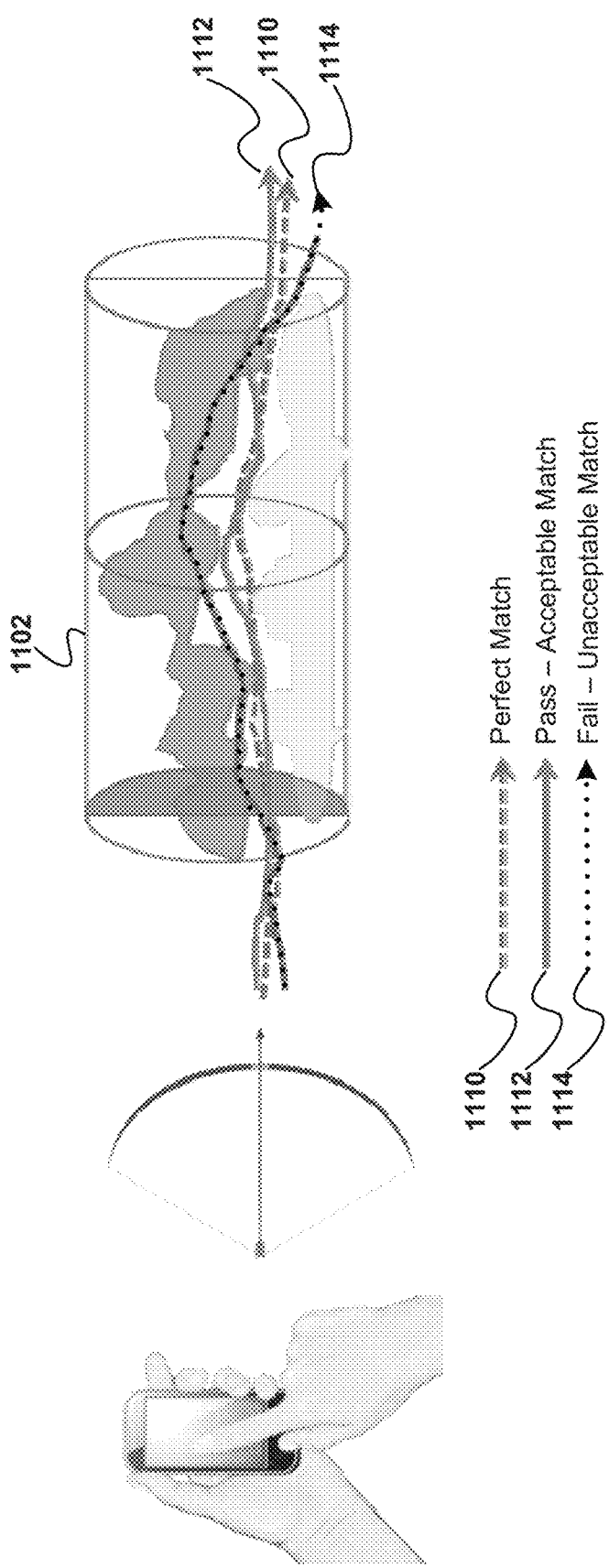
FIG. 11 illustrates authentication gestures evaluated by an effort straw, according to an embodiment.

FIG. 11 illustrates authentication gestures evaluated by an effort straw 1102, according to an embodiment. When a user attempts authentication via an authentication gesture, the gesture authentication system evaluates the authentication gesture through the effort straw 1102 previously calculated and stored in the user's PCCHL. The geospatial/Barycentric algorithms evaluate the data corresponding to the authentication attempt and determine whether the authentication attempt was sufficiently within the effort straw 1102 stored in the user's PCCHL. As illustrated in FIG. 11, an authentication attempt via gesture may be considered an "arrow" being shot through the effort straw 1102. Arrow 1110 represents an authentication attempt whose gesture perfectly matches the authentication gesture in the user's PCCHL. In actual conditions, a perfect match is nearly impossible. Arrow 1112 represents an authentication attempt whose gesture is sufficiently within the effort straw 1102 to be considered a match to the authentication gesture in the user's PCCHL; this authentication would pass/succeed. Finally, arrow 1114 represents an authentication attempt whose gesture is NOT sufficiently within the effort straw 1102 to be considered a match to the authentication gesture in the user's PCCHL; this authentication would fail.

This gesture authentication technique is device independent, in that it may be used by any number of devices. The authentication sketches may be scalable. For example, an authentication sketch performed on a 5-inch touchscreen display may be proportionally drawn on a 10-inch touchscreen display. In an embodiment, the host device uses a 1 ms or faster clock and has a touchscreen display that supports multi-touch input.

QR Codes

A QR code may be used to store user information, such as a user's PCCHL, thus enabling a host device to authenticate a user without the host having to perform network communications. This may be useful in various situations, such as when Internet connectivity to the host device is slow or unavailable, or where a fast authentication check is required. This also allows a PCCHL to be physically portable.

A QR code may be used to recreate another QR code. The error correction in ISO standard (ISO/IEC18004) for QR codes allows a QR code to have an error rate of up to 30% without a loss of data. Thus, the squares of a QR code may be "selectively damaged" to encode data, for example facts and/or questions relating to a user's PCCHL. A standard QR code may be configured, transmitted, and deployed in a way that stores information without other systems or people being able to decipher the QR code's content. Therefore, the QR code may function as a "server," enabling rapid authentication to protect confidential data, classified apps, restricted processes, or for other authentication purposes.

Although there are a large number of scenarios for which QR codes are ideally suited, one particularly suited application of QR codes is in combination with gesture-based authentication. Summary gesture metrics require a relatively small number of bytes, which fit inside the size limitations of a QR code. When a user draws a sketch during an authentication, the effort to draw the sketch is compared to the user's PCCHL, which contains similar efforts of that user. A properly formatted QR code may be used to store the user's PCCHL.

The QR authentication technology enables the host device (e.g., a computer protected by the previously described gesture authentication technology) to "request" a user's gesture simply by displaying (e.g., via an application executing on the host device) a properly formatted QR code. When the user sees the QR code, the user may scan the QR code with the user's smartphone app, which then invites the user to draw the expected sketch on the smartphone. Although the app will accept the sketch input, in an embodiment, the app will not display the sketch on the app's user interface to prevent unintentional observation by potential third parties. At the conclusion of the drawing effort, the smartphone app may return a report on how the drawing effort compared to other efforts in the user's PCCHL. The user may consume this report by one or more means, such as web services, Bluetooth/NFC (Near Field Communication), or directly in the app running on the host device.

Another potential use case is as follows: suppose the host device has a stored document that has been divided into sections. a respective section of the document has a minimum respective clearance level; a person with at least that respective clearance level is allowed to view the respective section of the document. A user selects the document for viewing. In response, the host device displays the QR code. The user scans the QR code with the user's smartphone, then traces the user's authentication gesture on the user's smartphone. Based on the nature and metrics of the effort expended in the user's response—and hence the user's authenticated status—access is selectively granted to various parts of the document without the host device ever knowing what was drawn and without the user's gesture being seen by anyone else.

App developers may embed this QR authentication capability into their own app workflow processes, presumably in a solicitation stage and a follow-on results-processing stage. The QR authentication technology may be available as deployable modules (e.g., dynamically linked libraries or "DLLs") with industry standard interfaces, making them easy to integrate, deploy, and use.

Figure 12:
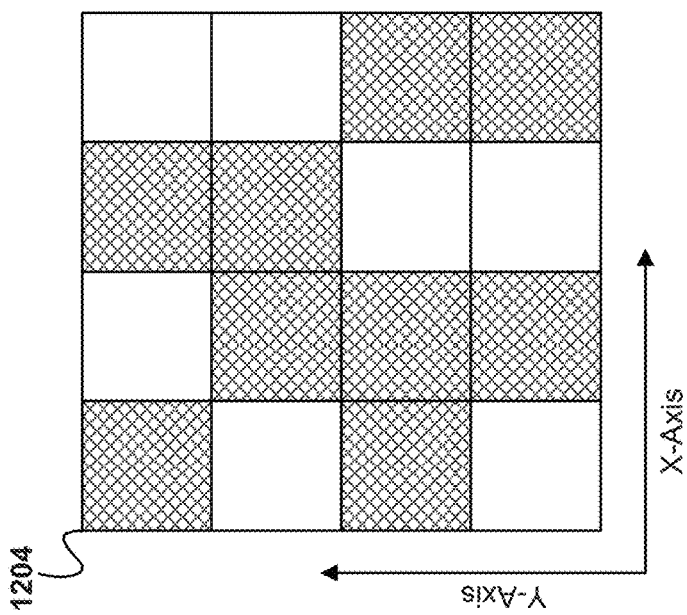
FIG. 12 illustrates expressing raw data as a QR code, according to an embodiment.
Figure 12:
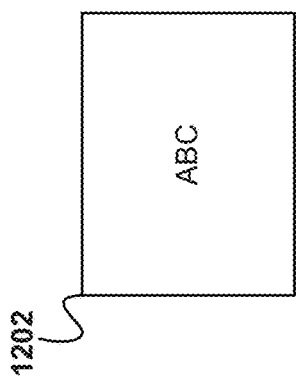

FIG. 12 illustrates expressing raw data as a QR code, according to an embodiment. In the illustrated example, the string "ABC" (the raw data 1202) is expressed as a QR code 1204 with nine shaded "data boxes." Although the data boxes are shaded in FIG. 12, a data box in a typical QR code would be solid black Each "data box" may be considered to be one "unit" square, and has an "address" corresponding to some coordinate system (e.g., Cartesian).

Figure 13:
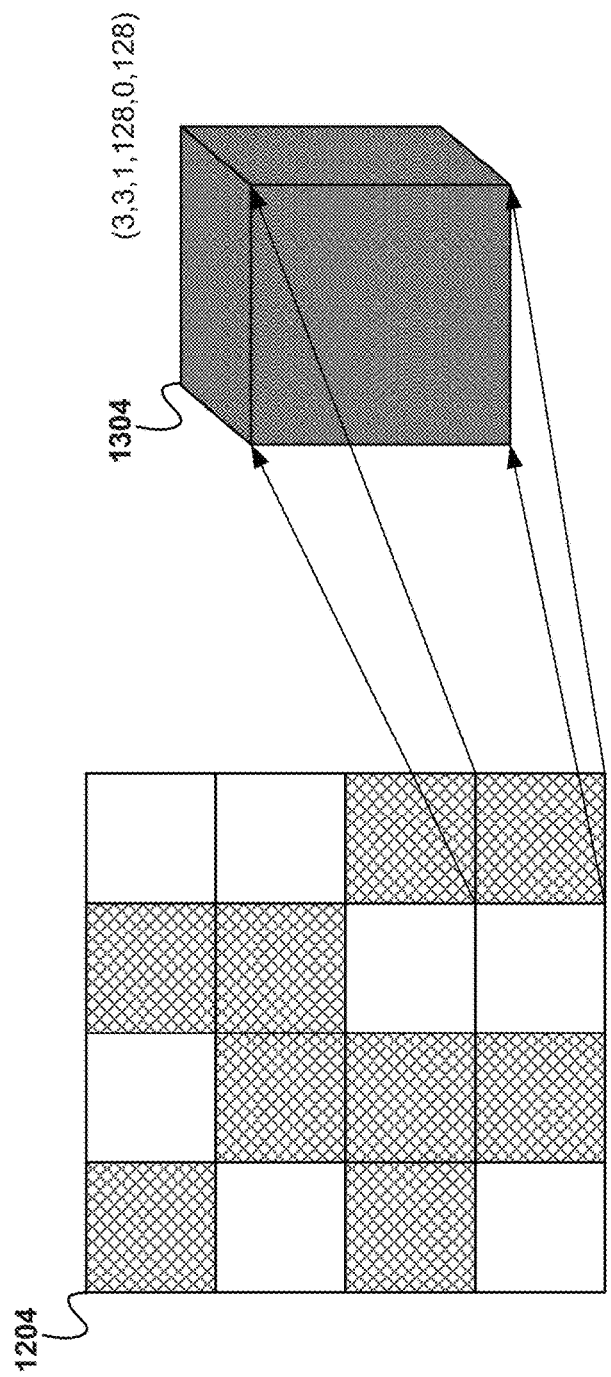
FIG. 13 illustrates converting a data box of a QR code into six dimensions, according to an embodiment.

FIG. 13 illustrates converting a data box of the QR code 1204 into six dimensions, according to an embodiment. Each "data box" of the QR code 1204 is assigned a random color and is transformed into a cube, whose "location" is expressed in two sets of dimensions: one set representing the physical dimensions of the cube and another set of dimensions representing the color of the cube. For example, if a Cartesian coordinate system (e.g., X, Y, and Z) is being used to represent physical dimensions and a Red-Green-Blue color model (e.g., RGB) is being used to represent color, each cube would have six dimensions: (X,Y,Z,R,G,B).

For example, the top-left corner of the bottom-right-most data box in the QR code 1204 has Cartesian coordinates (3,1); adding a third-dimension to this data box results in the (X,Y,Z) coordinates (3,3,1) for the corresponding cube 1304. The RGB values (128,0,128), which represent the color purple, were chosen at random and assigned to the cube 1304. Thus, the cube 1304 corresponding to the bottom-right-most data box in the QR code 1204 in this example has (X,Y,Z,R,G,B) coordinates of (3,3,1,128,0, 128).

Figure 14A:
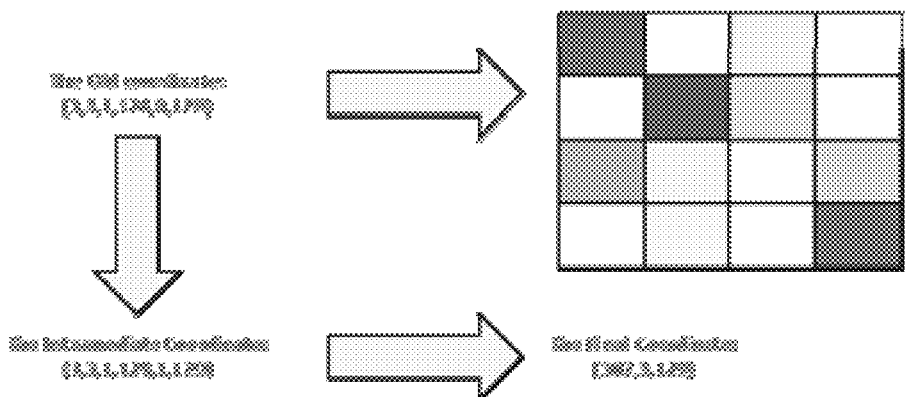
FIG. 14A illustrates converting a cube represented by six dimensions into a "final coordinate" of three dimensions, according to an embodiment.

FIG. 14A illustrates converting a cube represented by six dimensions into a "final coordinate" of three dimensions, according to an embodiment. For each data box of the QR code 1204, the six dimensional value (X,Y,Z,R,G,B) of its corresponding cube is translated into its corresponding final coordinate by compressing it back into three dimensions (X',Y',Z'). In an embodiment, the compression may use the formula $X'=X*R$, $Y'=Y*G$, and $Z'=Z*B$. In an embodiment, the physical dimension coordinates and/or the color values are adjusted by adding 1, thus avoiding multiplication by zero. For example, the (X,Y,Z,R,G,B) coordinates (3,3,1, 128,0,128) corresponding to data box (3,1) of the QR code 1204 would be converted as follows:

1. The RGB values of (3,3,1,128,0,128) are incremented by 1, resulting in an intermediate coordinate value of (3,3,1,129,1,129).

2. The intermediate coordinate value of (3,3,1,129,1,129) is converted into a final coordinate value: $X'=X*R=3*129=387$; $Y'=Y*G=3*1=3$; and $Z'=Z*B=1*129=129$. Thus, the final coordinate value (X', Y',Z') is (387,3,129).

Figure 14B:
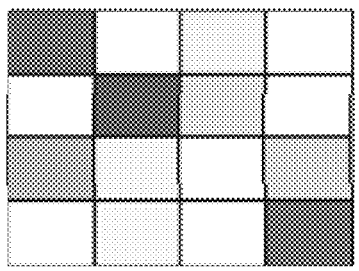
FIG. 14B illustrates two storage modalities of the disclosed QR data representation, according to an embodiment.
Figure 14B:
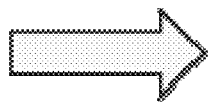
Figure 14B:
Figure 14B:
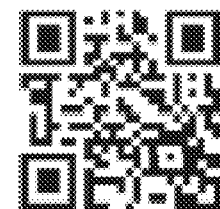

FIG. 14B illustrates two storage modalities of the disclosed QR data representation, according to an embodiment. The final coordinate for a data box of the QR code 1204 is ported to a Differentiation Cypher, which is created using the combination of: (1) the creation time of the source data (e.g., "ABC"), (2) the QR Code Version and Correction Level, and (3) the position of a given Differentiation Cypher in the final text string to map RGB color to a final coordinate. For example, the Differentiation Cyphers of all non-white data boxes of the QR code 1204 are converted into fixed-length text strings, whose text is then expressed as a QR code.

Figure 15:
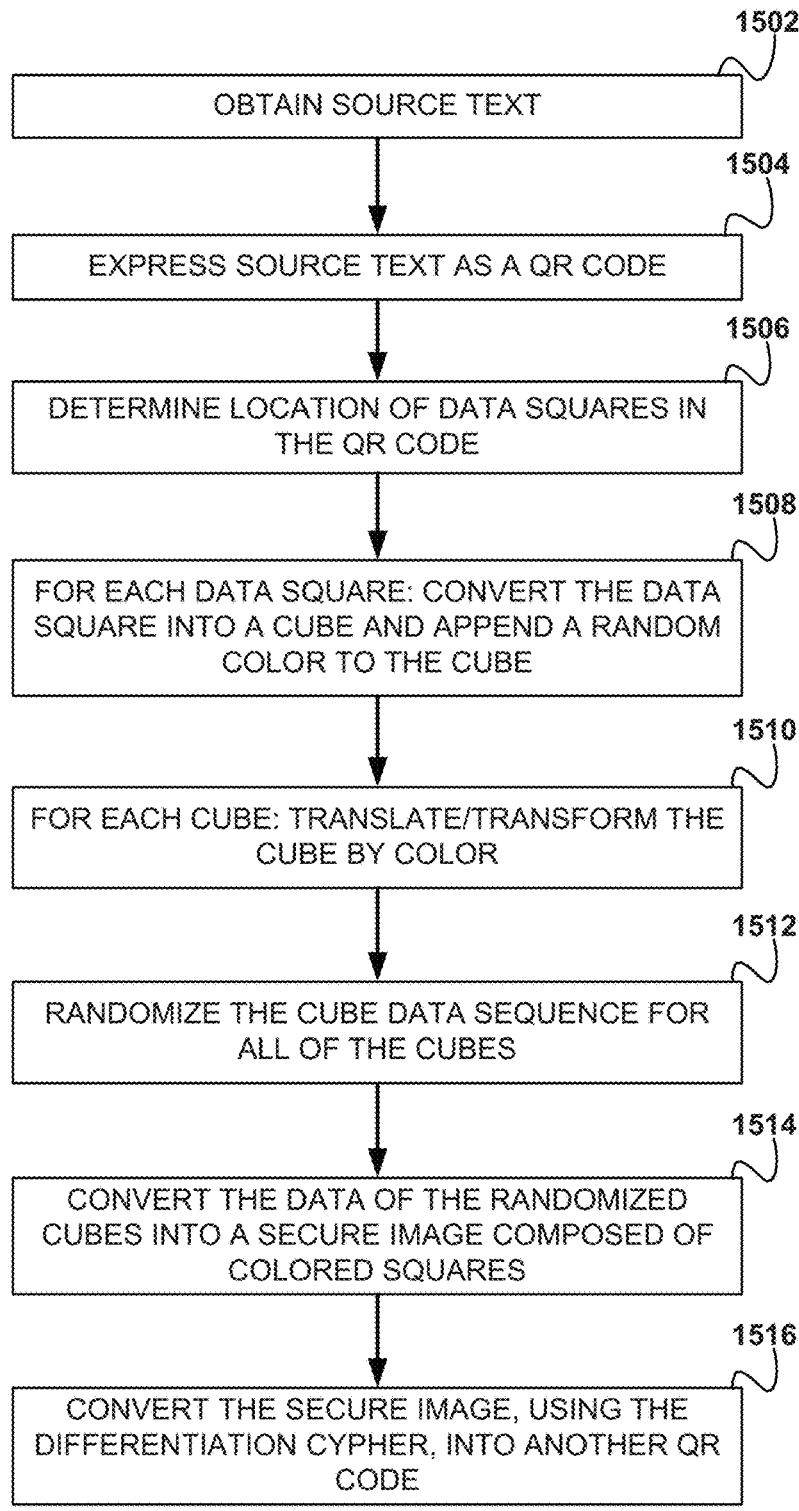
FIG. 15 is a flowchart of a method for obfuscating and storing data in a QR code, in accordance with some embodiments.

FIG. 15 is a flowchart of a method 1500 for obfuscating and storing data in a QR code, according to an embodiment.

A source text (e.g., a password) is obtained (operation 1502).

The source text is expressed in a QR code (operation 1504).

The location of the "data squares" is determined (operation 1506).

Each data square is converted into a cube, and a random color is appended to the cube (operation 1508).

Each cube is translated/transformed by color (operation 1510).

The cube data sequence for all of the cubes is randomized (operation 1512).

The data of the randomized cubes is saved to a server as a secure image composed of colored squares (operation 1514) and/or Optionally, the secure image is converted, using the Differentiation Cypher as the color-to-location mapper, into another QR code (operation 1516).

Figure 16:
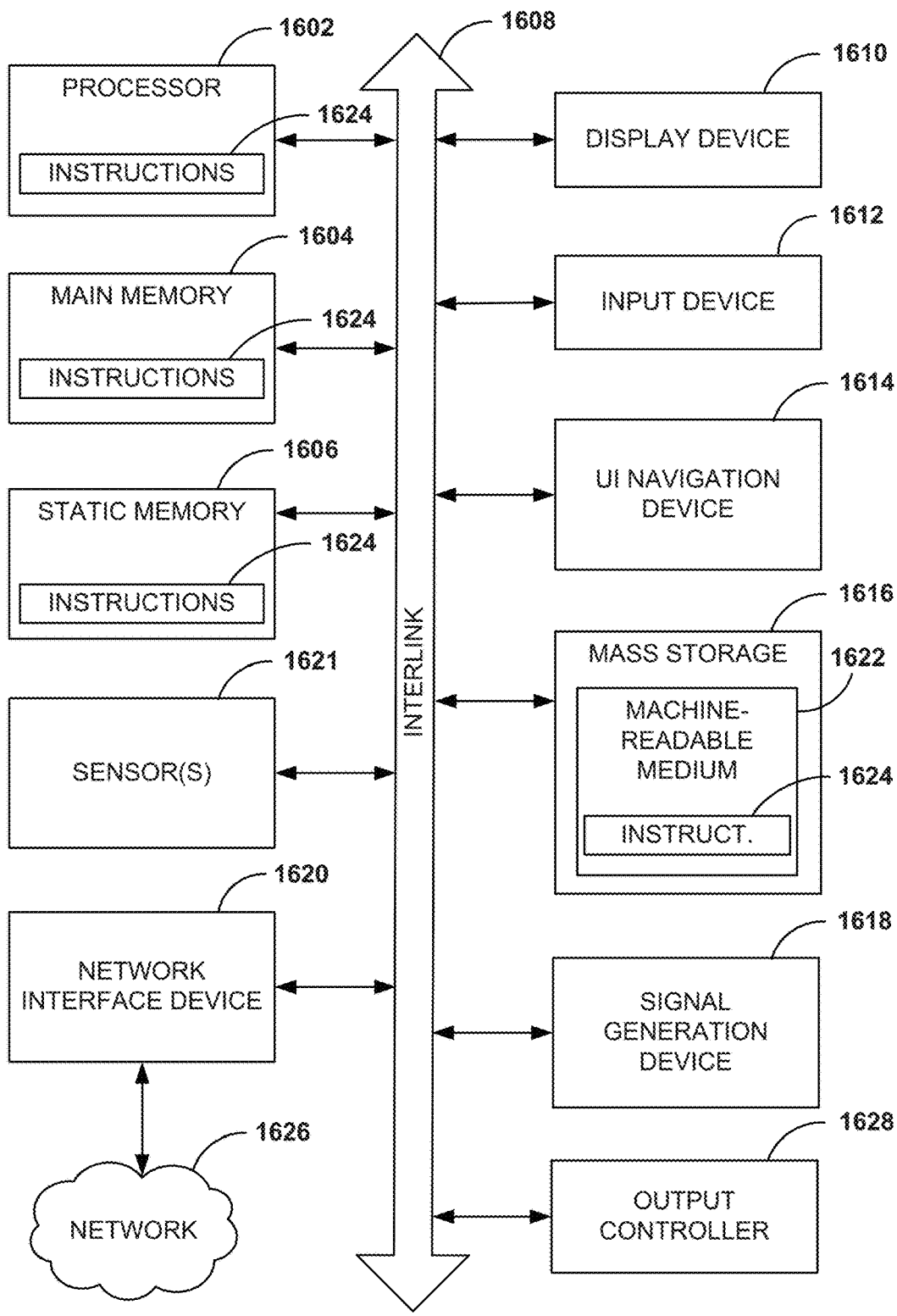
FIG. 16 is a block diagram illustrating a machine in the example form of a computer system, within which a set or sequence of instructions for causing the machine to perform any one of the methodologies discussed herein may be executed, in accordance with some embodiments.

Some Distinguishing Characteristics of the Disclosed QR Functionality:
  Data format change through QR
  Data confusion (lossless) in correction code
  Data format change through color
  Data sequence immaterial—Jackson Pollock style (random color splotches)
  Arbitrary color assignment by random Tick seed
  No reference to anything outside the QR code
  Identical source data always appears differently
  QR has Six Main Technology Aspects:
  "Use" related:
    contain a passphrase
    describe the gesture, rather than create it
    propound cryptographic nonces—[list]
    read a printed QR code (e.g., carried in a wallet) to provide the user's PCCHL to another host device
  "Send" related:
    Refer to the islands by either latitude/longitude or by position number (e.g., a left-to-right then top-to-bottom winding string)
    Has the ability to chain QR codes
  "Programming" related:
    can be written to run on a smartphone, a host application, or on a web services-enabled server
  "Limiting" related:
    can perform geofencing
    barcode painting can be hash-tagged to facilitate speedy identification of duplicate second attack
    duplicate rejection performed (variable time window)
    QR code lifecycle (availability) can be bounded by geofencing or elapsed time or usage count
  "Deforming" related:
    alternate between painting white islands and black islands
    blobs painted in random order
    contains random noise
    creates executable code to run a hidden program—interpolated execution
    drive a speech engine to propound question by sound
    point to a hidden URL
    ability to deform can itself be randomized
  "Color" related:
    color can be preserved in the QR bitmap
    level of color can be determined by normal cameras, like those on smartphones—does not require a 'professional' grade camera
    color is another dimension
    color can signal which characters to ignore FIG. 16 is a block diagram illustrating an example of a machine 1600, upon which any example embodiments may be implemented. In an embodiment, the machine 1600 is connected (e.g., networked) to other machines. In a networked deployment, the machine 1600 may operate in the capacity of a server machine, a client machine, or both a client machine and a server machine in server-client network environments. In an embodiment, the machine 1600 acts as a peer machine in peer-to-peer (P2P) (or other distributed) network environment. In an embodiment, machine 1600 is a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may perform, alone or in combination, specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the machine-readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1600 may include a hardware processor 1602 (e.g., a central processing unit (CPU), a graphics processing unit (GPU), a hardware processor core, or any combination thereof), a main memory 1604 and a static memory 1606, some or all of which may communicate with each other via an interlink (e.g., bus) 1608. The machine 1600 may further include a display device 1610, an input device 1612 (e.g., buttons, switches, a keyboard, etc.), and a user interface (UI) navigation device 1614 (e.g., a pointing stick, an isometric joystick or other isometric device, etc.). In an embodiment, the display device 1610, input device 1612, and UI navigation device 1614 may be a touch screen display. The machine 1600 may additionally include a storage device (e.g., drive unit) 1616, a signal generation device 1618 (e.g., a speaker), a network interface device 1620, and a sensor 1621, such as a global positioning system (GPS) sensor, compass, accelerometer, or other sensor. The machine 1600 may include an output controller 1628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 1616 may include a machine-readable medium 1622, on which is stored one or more sets of data structures or instructions 1624 (e.g., software) embodying or utilized by any one or more of the techniques or functions described herein. The instructions 1624 may also reside, completely or at least partially, within the main memory 1604, within static memory 1606, or within the hardware processor 1602 during execution thereof by the machine 1600. In an example, one or any combination of the hardware processor 1602, the main memory 1604, the static memory 1606, or the storage device 1616 may constitute machine-readable media.

Although the machine-readable medium 1622 is illustrated as a single medium, the term "machine-readable medium" may include a single medium or multiple media (e.g., a centralized or distributed database, and/or associated caches and servers) arranged to store the one or more instructions 1624.

The term "machine-readable medium" may include any medium that is capable of storing, encoding, or carrying instructions for execution by the machine 1600 and that cause the machine 1600 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 may further be transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, IEEE 802.15.1 family of standards (known as Bluetooth®), peer-to-peer (P2P) networks, among others. In an embodiment, the network interface device 1620 may include one or more physical jacks (e.g., Ethernet, coaxial, or phone jacks) and/or one or more antennas to connect to the communications network 1626. In an example, the network interface device 1620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1600, and includes digital or analog communications signals or other intangible medium to facilitate communication of such software.

The various operations of the example methods described herein may be performed, at least partially, by one or more processors that are temporarily arranged (e.g., by software instructions) or permanently arranged to perform the relevant operations. Whether temporarily or permanently arranged, such processors may constitute processor-implemented modules or objects that operate to perform one or more operations or functions. The modules and objects referred to herein, in some example embodiments, may comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but also deployed across a number of machines or computers. In some example embodiments, the processor or processors may be located in a single location (e.g., within a home environment, an office environment, at a server farm, etc.), while in other embodiments, the processors may be distributed across a number of locations.

The one or more processors may also operate to support performance of the relevant operations in a "cloud computing" environment or within the context of software as a service (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Additional Notes

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

Method examples described herein may be machine or computer-implemented at least in part. Some examples may include a machine-readable medium or machine-readable medium encoded with instructions operable to configure an electronic device to perform methods as described in the above examples. An implementation of such methods may include code, such as microcode, assembly language code, a higher-level language code, or the like. Such code may include machine-readable instructions for performing various methods. The code may form portions of computer program products. Further, in an example, the code may be tangibly stored on one or more volatile, non-transitory, or non-volatile tangible machine-readable media, such as during execution or at other times. Examples of these tangible machine-readable media may include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment.

The invention claimed is:

1. A user authentication system, comprising:
   a cadence library stored on a non-transitory computer-readable medium, wherein the cadence library corresponds to a user and has data corresponding to the user including base metrics associated with gestures of the user;
   one or more non-transitory memory storage devices; and
   one or more processors configured to execute instructions stored in the one or more non-transitory memory storage devices, which instructions, when executed by the processor, cause the user authentication system to perform operations to:
      record gesture data captured from a sensor device in response to the sensor device detecting gesture input by the user;
      process a combination of weighted metrics derived from the gesture data recorded, the combination correlated to proximity of the weighted metrics coupled with a density associated with the weighted metrics;
      compare the combination of weighted metrics to the data corresponding to the user within the cadence library.

2. The user authentication system of claim 1, wherein the operations include:
   segmentation of a user's input on a touchscreen sensor by time and vector changes mapped on a n-dimensional space composed of screen coordinates of the input, time, x-axis, y-axis, z-axis, roll, pitch, yaw, latitude, longitude, altitude, velocity, and force;
   collection of the segments into clusters of data representing weighted rollup metrics, using normalization statistical techniques; and
   assembling the clusters into effort metrics that describe a complete gesture representing a user's input on the touchscreen sensor.

3. The user authentication system of claim 1, wherein the gesture data is captured from multiple sensor devices.

4. The user authentication system of claim 1, wherein the operations include executing an enrollment process to capture the base metrics to form the cadence library corresponding to the user.

5. The user authentication system of claim 1, wherein the operations include:
   production of an indicator of similarity from the comparison of the combination of weighted metrics to the data corresponding to the user within the cadence library;
   generation, based on the comparison and one or more criteria for the comparison, of an indication signal representative of a determination that the combination of weighted metrics is a match with a collection of complete gestures contained in the cadence and habit library corresponding to the user; and generation of an expression of results of the determination as a set of metrics and derived summaries for subsequent analysis by an external process.

6. The user authentication system of claim 5, wherein the production of an indicator of similarity uses geospatial/Barycentric algorithms.

7. The user authentication system of claim 1, wherein the operations include storage of the cadence library in the form of a quick response (QR) matrix barcode.

8. The user authentication system of claim 7, wherein the operations include use of coordinate math and randomization to express a secure derivative of the cadence library in the QR matrix barcode.

9. The user authentication system of claim 7, wherein the operations include generation of QR matrix barcode as defined in one or more standards.

10. The user authentication system of claim 7, wherein the operations include formation of the QR matrix barcode by:
   reading bytes from the cadence library; and
   converting the bytes to the QR matrix barcode.

11. The user authentication system of claim 7, wherein the operations include:
   reading a QR matrix barcode image stored on non-transitory computer-readable medium or from a printed surface;
   eliminating duplicate values from data that fall within an error correction capacity of ISO standard ISO/IEC18004; and
   creating encoded image data from QR matrix barcode image.

12. The user authentication system of claim 11, wherein multiple QR matrix barcode images are used to reconstruct the bytes corresponding to the cadence library.

13. A user authentication system, comprising:
   a cadence library stored on a non-transitory computer-readable medium, wherein the cadence library corresponds to a user and has data corresponding to the user including base metrics associated with gestures of the user;
   one or more non-transitory memory storage devices; and
   one or more processors configured to execute instructions stored in the one or more non-transitory memory storage devices, which instructions, when executed by the processor, cause the user authentication system to perform operations to:
      record gesture data captured from a sensor device in response to the sensor device detecting gesture input by the user;
      process a combination of weighted metrics derived from the gesture data recorded;
      compare the combination of weighted metrics to the data corresponding to the user within the cadence library;
      store the cadence library in the form of a quick response (QR) matrix barcode;
      form the QR matrix barcode by:
         reading bytes from the cadence library; and
         converting the bytes to the QR matrix barcode;
      transcode location of each black square in the QR matrix barcode to a two-dimensional coordinate using the form x, y;
      add a third dimension to the coordinate forming a first three-dimensional coordinate to transform the square into a cube represented in a three-dimensional space using the form x, y, z;
      associate the three-dimensional coordinate with a randomly-generated color value, where the color is expressed as a combination of red, green, and blue values, each in a numeric range between 1 and 256, taking the form r, g, b;
      append three more dimensions to the cube with the three more dimensions corresponding to the red, green, and blue values of the associated color, forming a second three-dimensional coordinate using the form r, g, b;
      generate a new derivative three-dimensional coordinate, using the form x', y', z' by multiplying the values of the first three dimensions by the corresponding values of the second three dimensions, such that x'=x*r, y'=y*g, and z'=z*b;
      combine all the derivative three-dimensional coordinates corresponding to each of the black squares found in the QR matrix barcode, in newly-created encoded image data composed of colored squares corresponding to the derivative three-dimensional coordinates; and
      produce a new, valid QR matrix barcode image from the encoded image data.

14. The user authentication system of claim 13, wherein the operations include operations to introduce a subset of random duplicate values from the set of derivative three-dimensional coordinates which do not exceed an error correction capacity described in an associated standard.

15. The user authentication system of claim 13, wherein multiple QR matrix barcode images are encoded that represent component parts of the bytes from the cadence library.

16. A user authentication system, comprising:
   a cadence library stored on a non-transitory computer-readable medium, wherein the cadence library corresponds to a user and has data corresponding to the user including base metrics associated with gestures of the user;
   one or more non-transitory memory storage devices; and
   one or more processors configured to execute instructions stored in the one or more non-transitory memory storage devices, which instructions, when executed by the processor, cause the user authentication system to perform operations to:
      record gesture data captured from a sensor device in response to the sensor device detecting gesture input by the user;
      process a combination of weighted metrics derived from the gesture data recorded;
      compare the combination of weighted metrics to the data corresponding to the user within the cadence library;
      store the cadence library in the form of a quick response (QR) matrix barcode;
      read a QR matrix barcode image stored on non-transitory computer-readable medium or from a printed surface;
      eliminate duplicate values from data that fall within an error correction capacity; and
      create encoded image data from QR matrix barcode image;
      build an array of dimensional values from color and coordinate positions of each square element that is part of the encoded image data, with the dimensional values taking a form of x', y', z';
      convert the color of each element in the array of dimensional values into a corresponding set of red, green, and blue constituent values to be appended as additional dimensions, taking the form r, g, b, such that each dimensional value is expressed as x, y, z, r, g, b;

derive a collection of new coordinate values from the array of dimensional values, taking a form of x, y, z, by calculating a quotient for each coordinate position in the array of dimensional values, divided by corresponding red, green, and blue values of the same dimensional value, such that $x=x'/r$, $y=y'/g$, and $z=z'/b$;

construct a new QR matrix barcode image from the collection of new coordinate values, with each coordinate representing a single black square in the QR matrix barcode image; and interpret the value of the QR matrix barcode image as bytes of the cadence library.

* * * * *